(12) United States Patent
Hidaka et al.

(10) Patent No.: US 10,744,874 B2
(45) Date of Patent: Aug. 18, 2020

(54) HYBRID VEHICLE AND VEHICLE

(71) Applicant: MAZDA MOTOR CORPORATION, Aki-gun, Hiroshima (JP)

(72) Inventors: Seiji Hidaka, Hiroshima (JP); Eiji Mito, Hiroshima (JP); Tomoo Sawazaki, Nagoya (JP); Hideo Toyota, Niihama (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 123 days.

(21) Appl. No.: 16/085,983

(22) PCT Filed: Mar. 23, 2017

(86) PCT No.: PCT/JP2017/011597
§ 371 (c)(1),
(2) Date: Sep. 17, 2018

(87) PCT Pub. No.: WO2017/170081
PCT Pub. Date: Oct. 5, 2017

(65) Prior Publication Data
US 2019/0031022 A1    Jan. 31, 2019

(30) Foreign Application Priority Data

Mar. 29, 2016 (JP) .................... 2016-066364
Mar. 29, 2016 (JP) .................... 2016-066367

(51) Int. Cl.
*B60K 17/16* (2006.01)
*B60K 6/40* (2007.10)
(Continued)

(52) U.S. Cl.
CPC ............ *B60K 17/16* (2013.01); *B60K 1/02* (2013.01); *B60K 6/26* (2013.01); *B60K 6/36* (2013.01);
(Continued)

(58) Field of Classification Search
CPC . B60K 6/40; B60K 6/48; B60K 6/485; B60K 2006/4808; B60K 17/16
See application file for complete search history.

(56) References Cited

U.S. PATENT DOCUMENTS 8,567,540 B2 * 10/2013 Janson ................ B60K 6/26
180/65.22
9,126,581 B2 * 9/2015 Swales ................ B60W 20/40
(Continued)

FOREIGN PATENT DOCUMENTS

DE       19655299 B4 *  2/2006  ............ B60K 6/387
DE   102011079370 A1    1/2013
(Continued)

OTHER PUBLICATIONS

European Patent Office, Extended European Search Report Issued in Application No. 17774622.9, dated Jan. 23, 2019, 9 pages.

*Primary Examiner* — Sherry L Estremsky
(74) *Attorney, Agent, or Firm* — Alleman Hall Creasman & Tuttle LLP

(57) ABSTRACT

A vehicle, such as a hybrid vehicle, according to one aspect of the present invention is configured such that: a propeller shaft rotated by an engine is arranged so as to extend in a vehicle body front-rear direction; a drive gear provided at a rear end portion of the propeller shaft and a driven gear configured to rotate together with a differential case of a differential device mesh with each other; a motor or a generator is connected to the differential case so as to transmit power to the differential case; the motor or the generator is arranged at one of vehicle width direction right and left sides of an axis of the propeller shaft; and the differential case is arranged at the other of the vehicle width direction right and left sides of the axis of the propeller shaft.

19 Claims, 14 Drawing Sheets

(51) Int. Cl.
*B60K 1/02* (2006.01)
*B60K 6/26* (2007.10)
*B60K 6/485* (2007.10)
*B60K 6/52* (2007.10)
*B60K 6/54* (2007.10)
*B60K 6/365* (2007.10)
*B60K 6/36* (2007.10)
*B60K 17/04* (2006.01)
*B60K 6/48* (2007.10)
*B60K 6/405* (2007.10)
*B60K 1/00* (2006.01)

(52) U.S. Cl.
CPC ............... *B60K 6/365* (2013.01); *B60K 6/40* (2013.01); *B60K 6/405* (2013.01); *B60K 6/48* (2013.01); *B60K 6/485* (2013.01); *B60K 6/52* (2013.01); *B60K 6/54* (2013.01); *B60K 17/04* (2013.01); *B60K 2001/001* (2013.01); *B60K 2006/4808* (2013.01); *B60K 2006/4833* (2013.01); *Y02T 10/6226* (2013.01); *Y02T 10/6265* (2013.01)

(56) References Cited

U.S. PATENT DOCUMENTS

| | | | |
|---|---|---|---|
| 10,030,755 B2 * | 7/2018 | Severinsson | B60K 17/3462 |
| 10,525,810 B2 * | 1/2020 | Jegebris | B60K 17/16 |
| 2006/0046894 A1 * | 3/2006 | Kyle | B60K 6/26 477/3 |
| 2012/0234120 A1 | 9/2012 | Fukuda et al. | |
| 2014/0335995 A1 | 11/2014 | Swales et al. | |
| 2018/0022202 A1 * | 1/2018 | Urabe | B60K 1/02 180/65.26 |
| 2019/0077268 A1 * | 3/2019 | Kuwahara | B60L 50/16 |

FOREIGN PATENT DOCUMENTS

| | | |
|---|---|---|
| DE | 102013205175 A1 | 9/2014 |
| JP | 2582505 B2 | 2/1997 |
| JP | 2001039179 A | 2/2001 |
| JP | 2012148749 A | 8/2012 |
| JP | 2012193779 A | 10/2012 |

* cited by examiner

HYBRID VEHICLE AND VEHICLE

TECHNICAL FIELD

The present invention relates to a vehicle, such as a hybrid vehicle, including a motor or generator arranged on an axle.

BACKGROUND ART

As a hybrid vehicle including an engine and a motor as driving sources, various vehicles are proposed and put into practical use in recent years. For example, PTL 1 discloses that in a front engine-rear drive (FR) hybrid vehicle, motors configured to transmit power to a differential case of a differential device are arranged at respective left and right axles.

In the hybrid vehicle of PTL 1, when the motor drives while the engine is driving, power transmitted from the motor is integrated in the differential case with power transmitted from the engine through a transmission and a propeller shaft. With this, torque assist is performed by the motor, and the power integrated in the differential case is transmitted through the axles to driving wheels. Further, when the motor drives while the engine is in a stop state, the power of the motor is transmitted through the differential device and the axles to the driving wheels. Thus, motor traveling is performed.

CITATION LIST

Patent Literature

PTL 1: Japanese Patent No. 2582505

SUMMARY OF INVENTION

Technical Problem

As shown in FIG. 13, generally, each of a left axle 530L extending between a differential device 520 and a driving wheel 538L in a vehicle body width direction and a right axle 530R extending between the differential device 520 and a driving wheel 538R in the vehicle body width direction is divided into three portions that are a differential device-side shaft portion 531, an intermediate shaft portion 532, and a driving wheel-side shaft portion 533, which are arranged in this order from a vehicle body width direction inner side. The adjacent shaft portions are coupled to each other through a universal joint 534 or 535.

Regarding the axles 530L and 530R, to improve efficiency of power transmission from the differential device 520 to the driving wheels 538L and 538R, it is preferable to reduce a bend angle of the intermediate shaft portion 532 with respect to the driving wheel-side shaft portion 533 and a bend angle of the intermediate shaft portion 532 with respect to the differential device-side shaft portion 531. Therefore, it is preferable that the intermediate shaft portion 532 be configured as long as possible. In order to realize this, the universal joint 534 at the vehicle body width direction inner side is arranged close to the differential device 520 located at a vehicle body width direction middle (on an axis of a propeller shaft 514), and the universal joint 535 at a vehicle body width direction outer side is arranged close to the driving wheel 538L or 538R.

When the bend angles at the universal joints 534 and 535 are different between the left and right axles 530L and 530R, a difference between the efficiency of power transmission of the axle 530L and the efficiency of power transmission of the axle 530R is generated, and therefore, a difference between torque transmitted to the left driving wheel 538L and torque transmitted to the right driving wheel 538R is easily generated. On this account, it is preferable that the universal joints 534 and 535 on the axles 530L and 530R be arranged substantially bilaterally symmetrically.

However, as shown in FIG. 14, in a FR hybrid vehicle, when a motor 650 is arranged at an axle 630R that is one of the left and right axles, the motor 650 is arranged at a differential device-side shaft portion 631R of the axle 630R, and an inner universal joint 634R, an intermediate shaft portion 632R, an outer universal joint 635R, and a driving wheel-side shaft portion 633R are arranged in this order at the vehicle body width direction outer side of the motor 650.

In this case, on the axle 630R at which the motor 650 is arranged, the motor 650 is interposed between a differential device 620 and the inner universal joint 634R. Therefore, it is difficult to arrange the inner universal joint 634R close to the differential device 620. On this account, the intermediate shaft portion 632R becomes short. Thus, the bend angles at the universal joints 634R and 635R increase, and therefore, the efficiency of power transmission to the driving wheel 638R tends to deteriorate.

On the axle 630L in contrast to the axle 630R at which the motor 650 is arranged, an inner universal joint 634L is arranged close to the differential device 620, and with this, the intermediate shaft portion 632L is easily configured to be long. However, in this case, the bend angles at the universal joints 634L, 634R, 635L, and 635R become different between the left and right axles 630L and 630R, and therefore, a difference between the efficiency of power transmission of the left axle 630L and the efficiency of power transmission of the right axle 630R is generated. On this account, a difference between the torque transmitted to the left driving wheel 638L and the torque transmitted to the right driving wheel 638R is easily generated.

An object of the present invention is to, in a vehicle, such as a hybrid vehicle, in which a motor or a generator is arranged on an axle, prevent efficiency of power transmission of the axle from deteriorating and avoid the generation of a difference between torque transmitted to a left driving wheel and torque transmitted to a right driving wheel.

Solution to Problem

To solve the above problems, the vehicle, such as the hybrid vehicle, according to the present invention is configured as below.

A first aspect of the present invention in the present application is a hybrid vehicle including: an engine; a propeller shaft rotated by the engine and arranged so as to extend in a vehicle body front-rear direction; a drive gear provided at a rear end portion of the propeller shaft; a differential device including a driven gear meshing with the drive gear, a differential case configured to rotate together with the driven gear, and a pair of left and right side gears accommodated in an accommodating portion of the differential case; a left axle connecting the left side gear and a left driving wheel through a universal joint; a right axle connecting the right side gear and a right driving wheel through a universal joint; and a motor connected to the differential case so as to transmit power to the differential case, wherein: the motor is arranged at one of right and left sides with respect to an axis of the propeller shaft in a vehicle body width direction; and the differential case is arranged at the other of the right and left sides with respect to the axis of the propeller shaft in the vehicle body width direction.

The hybrid vehicle according to a second aspect of the present invention is configured such that: in the first aspect of the present invention, the motor is arranged at the right side with respect to the axis of the propeller shaft in the vehicle body width direction and arranged on the right axle; and the differential case is arranged such that the accommodating portion is located at the left side with respect to the axis of the propeller shaft in the vehicle body width direction.

The hybrid vehicle according to a third aspect of the present invention is configured such that: in the first aspect of the present invention, the motor is arranged at the right side with respect to the axis of the propeller shaft in the vehicle body width direction and arranged on the right axle; and the differential case is arranged such that the accommodating portion is located at the left side with respect to the axis of the propeller shaft in the vehicle body width direction and located adjacent to the drive gear at a left side of the drive gear in the vehicle body width direction.

The hybrid vehicle according to a fourth aspect of the present invention is configured such that in the second or third aspect of the present invention, a battery electrically connected to the motor is arranged at the right side with respect to the propeller shaft in the vehicle body width direction.

The hybrid vehicle according to a fifth aspect of the present invention is configured such that in any one of the second to fourth aspects of the present invention, an exhaust pipe of the engine is arranged at the left side with respect to the propeller shaft in the vehicle body width direction, the exhaust pipe extending in the vehicle body front-rear direction.

The hybrid vehicle according to a sixth aspect of the present invention is configured such that: in the first aspect of the present invention, the motor is arranged at the left side with respect to the axis of the propeller shaft in the vehicle body width direction and arranged on the left axle; and the differential case is arranged such that the accommodating portion is located at the right side with respect to the axis of the propeller shaft in the vehicle body width direction.

The hybrid vehicle according to a seventh aspect of the present invention is configured such that: in the first aspect of the present invention, the motor is arranged at the left side with respect to the axis of the propeller shaft in the vehicle body width direction and arranged on the left axle; and the differential case is arranged such that the accommodating portion is located at the right side with respect to the axis of the propeller shaft in the vehicle body width direction and located adjacent to the drive gear at a right side of the drive gear in the vehicle body width direction.

The hybrid vehicle according to an eighth aspect of the present invention is configured such that in any one of the sixth to eighth aspects of the present invention, a battery electrically connected to the motor is arranged at the left side with respect to the propeller shaft in the vehicle body width direction.

The hybrid vehicle according to a ninth aspect of the present invention is configured such that in any one of the sixth to eighth aspects of the present invention, an exhaust pipe of the engine is arranged at the right side with respect to the propeller shaft in the vehicle body width direction, the exhaust pipe extending in the vehicle body front-rear direction.

The hybrid vehicle according to a tenth aspect of the present invention is configured such that: in any one of the first to ninth aspects of the present invention, the motor is connected to the differential case through a speed reducer smaller in diameter than the motor; and the speed reducer is arranged between the drive gear and the motor.

The hybrid vehicle according to an eleventh aspect of the present invention is configured such that: in the tenth aspect of the present invention, the motor is connected to the differential case through the speed reducer smaller in diameter than the motor; and the speed reducer and the drive gear are arranged so as to overlap each other in the vehicle body width direction.

A twelfth aspect of the present invention is a hybrid vehicle including: an engine; a propeller shaft rotated by the engine and arranged so as to extend in a vehicle body front-rear direction; a drive gear provided at a rear end portion of the propeller shaft; a differential device including a driven gear meshing with the drive gear, a differential case configured to rotate together with the driven gear, and a pair of left and right side gears accommodated in an accommodating portion of the differential case; a left axle connecting the left side gear and a left driving wheel through a universal joint; a right axle connecting the right side gear and a right driving wheel through a universal joint; and a generator connected to the differential case, wherein: the generator is arranged at one of right and left sides with respect to an axis of the propeller shaft in a vehicle body width direction; and the differential case is arranged at the other of the right and left sides with respect to the axis of the propeller shaft in the vehicle body width direction.

Advantageous Effects of Invention

According to the first aspect of the present invention, the differential case is arranged at the right or left side with respect to the axis of the propeller shaft in the vehicle body width direction. With this, the motor is easily arranged closer to the vehicle body width direction middle than a conventional case where the accommodating portion of the differential case is arranged on the axis of the propeller shaft.

According to the second aspect of the present invention, the accommodating portion of the differential case is arranged at the left side with respect to the axis of the propeller shaft in the vehicle body width direction. With this, the motor arranged on the right axle is easily arranged closer to the vehicle body width direction middle than a conventional case where the accommodating portion of the differential case is arranged on the axis of the propeller shaft.

According to the third aspect of the present invention, the accommodating portion of the differential case is arranged adjacent to the drive gear at the left side of the drive gear in the vehicle body width direction, the drive gear being provided at the rear end portion of the propeller shaft. With this, the motor arranged on the right axle is easily arranged closer to the vehicle body width direction middle than a conventional case where the accommodating portion of the differential case is arranged at a position that is the same in the vehicle body width direction as the position of the drive gear.

Therefore, according to the second and third aspects of the present invention, in the right axle, a region extending from the motor to the driving wheel can be enlarged in the vehicle body width direction. On this account, a distance between universal joints provided in this region of the axle is easily secured. With this, the bend angles at the universal joints are easily made small. Thus, the efficiency of power transmission of the right axle at which the motor is arranged can be prevented from deteriorating.

Further, at the left axle, the motor is not interposed between the differential device and the universal joint. With this, a vehicle body width direction region extending from the differential device to the driving wheel can be adequately secured, and a distance between universal joints provided in this region can be adequately secured. Therefore, at the left and right axles, the universal joints are easily arranged bilaterally symmetrically. On this account, a difference between the efficiency of power transmission of the left axle and the efficiency of power transmission of the right axle is hardly generated. With this, a difference between the torque transmitted to the left driving wheel and the torque transmitted to the right driving wheel is hardly generated.

According to the fourth aspect of the present invention, when the battery is arranged at the right side with respect to the propeller shaft in the vehicle body width direction, the motor is arranged on the right axle located at the same side as the battery. Therefore, the battery and the motor are easily arranged close to each other. With this, routing of an electric wire connecting the battery and the motor is easily simplified or shortened.

According to the fifth aspect of the present invention, the exhaust pipe of the engine is arranged at the left side with respect to the propeller shaft in the vehicle body width direction, but the motor is arranged on the right axle located at the opposite side to the exhaust pipe. Therefore, heat damage caused by the exhaust pipe can be prevented from occurring at the motor.

According to the sixth aspect of the present invention, the accommodating portion of the differential case is arranged at the right side with respect to the axis of the propeller shaft in the vehicle body width direction. With this, the motor arranged on the left axle is easily arranged closer to the vehicle body width direction middle than a conventional case where the accommodating portion of the differential case is arranged on the axis of the propeller shaft.

According to the seventh aspect of the present invention, the accommodating portion of the differential case is arranged adjacent to the drive gear at the right side of the drive gear in the vehicle body width direction, the drive gear being provided at the rear end portion of the propeller shaft. With this, the motor arranged on the left axle is easily arranged closer to the vehicle body width direction middle than a conventional case where the accommodating portion of the differential case is arranged at a position that is the same in the vehicle body width direction as the position of the drive gear.

Therefore, according to the sixth and seventh aspects of the present invention, in the left axle, a region extending from the motor to the driving wheel can be enlarged in the vehicle body width direction. On this account, a distance between universal joints provided in this region of the axle is easily secured. With this, the bend angles at the universal joints are easily made small. Thus, the efficiency of power transmission of the left axle at which the motor is arranged can be prevented from deteriorating.

Further, at the right axle, the motor is not interposed between the differential device and the universal joint. With this, a vehicle body width direction region extending from the differential device to the driving wheel can be adequately secured, and a distance between universal joints provided in this region can be adequately secured. Therefore, at the left and right axles, the universal joints are easily arranged bilaterally symmetrically. On this account, a difference between the efficiency of power transmission of the left axle and the efficiency of power transmission of the right axle is hardly generated. With this, a difference between the torque transmitted to the left driving wheel and the torque transmitted to the right driving wheel is hardly generated.

According to the eighth aspect of the present invention, when the battery is arranged at the left side with respect to the propeller shaft in the vehicle body width direction, the motor is arranged on the left axle located at the same side as the battery. Therefore, the battery and the motor are easily arranged close to each other. With this, routing of the electric wire connecting the battery and the motor is easily simplified or shortened.

According to the ninth aspect of the present invention, the exhaust pipe of the engine is arranged at the right side with respect to the propeller shaft in the vehicle body width direction, but the motor is arranged on the left axle located at the opposite side to the exhaust pipe. Therefore, heat damage caused by the exhaust pipe can be prevented from occurring at the motor.

According to the tenth aspect of the present invention, output torque of the motor can be increased and then transmitted to the differential case by the speed reducer. With this, the motor can be downsized. Further, the speed reducer smaller in diameter than the motor is arranged between the drive gear and the motor. With this, the speed reducer is easily arranged close to the drive gear while avoiding interference of the speed reducer with the drive gear and its peripheral members. Therefore, the drive gear, the speed reducer, and the motor are easily and compactly arranged in a space limited in the vehicle body width direction.

According to the eleventh aspect of the present invention, the output torque of the motor can be increased and then transmitted to the differential case by the speed reducer. With this, the motor can be downsized. Further, the speed reducer smaller in diameter than the motor and the drive gear are arranged so as to overlap each other in the vehicle body width direction. With this, an interval between the drive gear and the axle in the vehicle body front-rear direction is prevented from increasing, and the motor is easily arranged close to the left side in the vehicle body width direction together with the speed reducer. Therefore, the drive gear, the speed reducer, and the motor can be further compactly arranged in a space limited in the vehicle body width direction. Further, since a layout space for the speed reducer and the motor is enlarged in the vehicle body width direction, the speed reducer and the motor can be increased in size in the vehicle body width direction to increase respective outputs.

According to the twelfth aspect of the present invention, the differential case is arranged at the right or left side with respect to the axis of the propeller shaft in the vehicle body width direction. With this, the generator is easily arranged closer to the vehicle body width direction middle than a case where the accommodating portion of the differential case is arranged on the axis of the propeller shaft.

DESCRIPTION OF EMBODIMENTS

Hereinafter, embodiments of the present invention will be explained in detail with reference to the attached drawings.

Embodiment 1

First, a hybrid vehicle 10 according to Embodiment 1 will be explained with reference to FIGS. 1 to 3.

Entire Configuration

Figure 1:
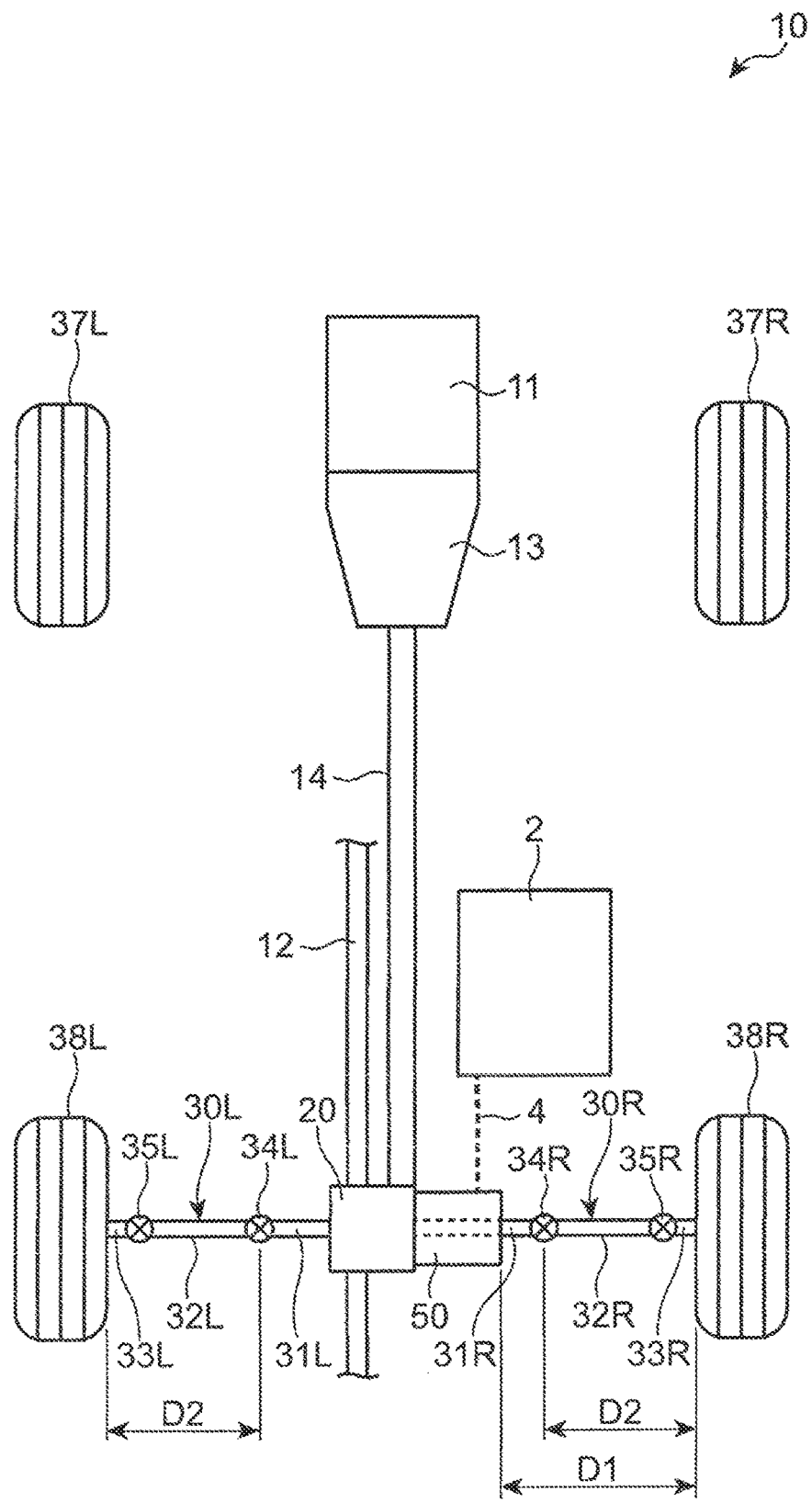
FIG. 1 is a plan view showing an entire configuration of a drive system of a FR hybrid vehicle according to Embodiment 1 of the present invention.

As shown in FIG. 1, the hybrid vehicle 10 is a FR automobile including left and right rear wheels 38L and 38R as driving wheels and left and right front wheels 37L and 37R as driven wheels. The hybrid vehicle 10 includes an engine 11 and a motor 51 (see FIGS. 2 and 3) as driving sources for vehicle traveling.

The engine 11 is mounted in an engine room located at a vehicle body front portion. The engine 11 is a longitudinally mounted type, and an output shaft of the engine 11 is coupled to a propeller shaft 14 through a transmission 13 provided at a vehicle body rear side of the engine 11 side by side with the engine 11. With this, the propeller shaft 14 can be rotated by the engine 11. The propeller shaft 14 is arranged so as to extend in a vehicle body front-rear direction. A center axis of the propeller shaft 14 is arranged at a vehicle body width direction substantially middle. Universal joints (not shown) are provided at the propeller shaft 14, and the propeller shaft 14 is constituted by a plurality of shaft members coupled to one another through the universal joints.

An exhaust pipe 12 of the engine 11 is arranged so as to extend along the propeller shaft 14 in the vehicle body front-rear direction. The exhaust pipe 12 is arranged so as to extend at a left side with respect to the propeller shaft 14 in a vehicle body width direction.

The exhaust pipe 12 is not necessarily arranged at the left side of the propeller shaft 14 over the entire length. In a region in which at least a rear end portion of the propeller shaft 14 is located in the vehicle body front-rear direction, the exhaust pipe 12 is arranged at the left side with respect to the propeller shaft 14 in the vehicle body width direction with a gap.

A battery 2 electrically connected to the motor 51 through an electric wire 4 is arranged at a right side with respect to the propeller shaft 14 in the vehicle body width direction. When the motor 51 drives, the battery 2 supplies electric power to the motor 51. When the motor 51 operates as a power generator, the battery 2 is charged by electric power supplied from the motor 51. The battery 2 is arranged in, for example, a space located under a rear seat. A fuel tank (not shown) is arranged at the left side of the battery 2 across the propeller shaft 14.

A rear end side of the propeller shaft 14 is connected through a differential device 20 to left and right axles 30L and 30R extending in the vehicle body width direction. A pair of inner and outer universal joints 34 (34L, 34R) and 35 (35L, 35R) are arranged at the axle 30 (30L, 30R) so as to be spaced apart from each other in the vehicle body width direction.

Each of the axles 30 includes a differential device-side shaft portion 31 (31L, 31R), an intermediate shaft portion 32 (32L, 32R), and a driving wheel-side shaft portion 33 (33L, 33R). The differential device-side shaft portion 31, the intermediate shaft portion 32, and the driving wheel-side shaft portion 33 are arranged in this order from the differential device 20 side in the vehicle body width direction.

One end side of the differential device-side shaft portion 31 is coupled to the differential device 20, and the other end side of the differential device-side shaft portion 31 is coupled to the intermediate shaft portion 32 through the inner universal joint 34. One end side of the driving wheel-side shaft portion 33 is coupled to the driving wheel 38 (38L, 38R), and the other end side of the driving wheel-side shaft portion 33 is coupled to the intermediate shaft portion 32 through the outer universal joint 35.

Schematic Configuration of Major Components of Drive System

Figure 2:
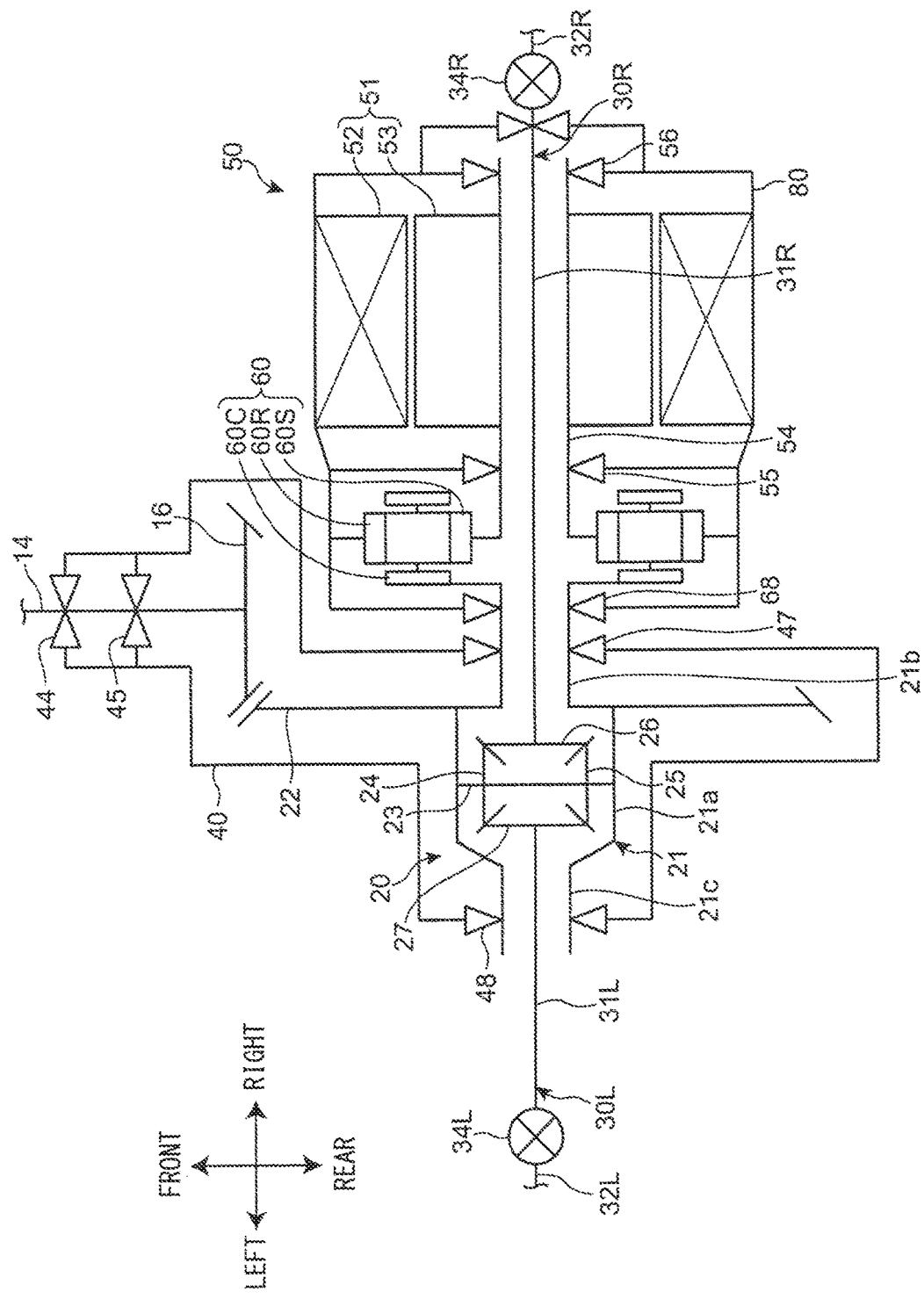
FIG. 2 is a schematic diagram showing configurations of a differential device and its peripheral portions in the drive system.

As shown in FIG. 2, a drive gear 16 is provided at the rear end portion of the propeller shaft 14. The differential device 20 includes: a driven gear 22 meshing with the drive gear 16; and a differential case 21 that rotates together with the driven gear 22.

The differential case 21 includes an accommodating portion 21a. A pinion shaft 23 extending in a direction perpendicular to the vehicle body width direction penetrates the accommodating portion 21a. Further, the accommodating portion 21a of the differential case 21 accommodates a pair of pinion gears 24 and 25 and a pair of right and left side gears 26 and 27. The pinion gears 24 and 25 are rotatably provided on the pinion shaft 23 and opposed to each other. Each of the right and left side gears 26 and 27 meshes with both the pinion gears 24 and 25.

The differential case 21 further includes a pair of right and left tubular portions 21b and 21c extending from the accommodating portion 21a toward both respective vehicle body width direction sides. The differential device-side shaft portions 31 of the axles 30 are inserted into the respective tubular portions 21b and 21c. Tip ends of the differential device-side shaft portions 31 are splined to the respective side gears 26 and 27.

With this, as shown in FIGS. 1 and 2, the left axle 30L connects the left side gear 27 and the left driving wheel 38L through a pair of universal joints 34L and 35L, and the right axle 30R connects the right side gear 26 and the right driving wheel 38R through a pair of universal joints 34R and 35R.

According to the above configuration, power transmitted from the engine 11 through the transmission 13 and the propeller shaft 14 to the differential case 21 of the differential device 20 is transmitted to the left and right axles 30L and 30R and the driving wheels 38L and 38R such that a rotation difference corresponds to a vehicle traveling state.

A motor unit 50 including the motor 51 is arranged on the differential device-side shaft portion 31R of the right axle 30R. In addition to the motor 51, the motor unit 50 further includes a speed reducer 60 arranged on the axle 30R so as to be located between the differential device 20 and the motor 51. The motor 51 and the speed reducer 60 are accommodated in a unit case 80 and unitized.

Power of the motor 51 is decelerated and then transmitted to the differential case 21 by the speed reducer 60. With this, output torque of the motor 51 is increased by the speed reducer 60. Therefore, the motor 51 can be downsized while increasing the torque input from the motor 51 to the differential case 21.

The differential case 21 is configured such that the power transmitted from the engine 11 and the power transmitted from the motor 51 join together. A power transmission path extending from the motor 51 to the differential case 21 is formed independently from a power transmission path extending from the engine 11 to the differential case 21. Therefore, by mounting the preassembled motor unit 50 on the axle 30R without changing configurations related to the power transmission path extending from the engine 11, an engine automobile can be easily converted into a hybrid vehicle.

Rear End Portion of Propeller Shaft

Figure 3:
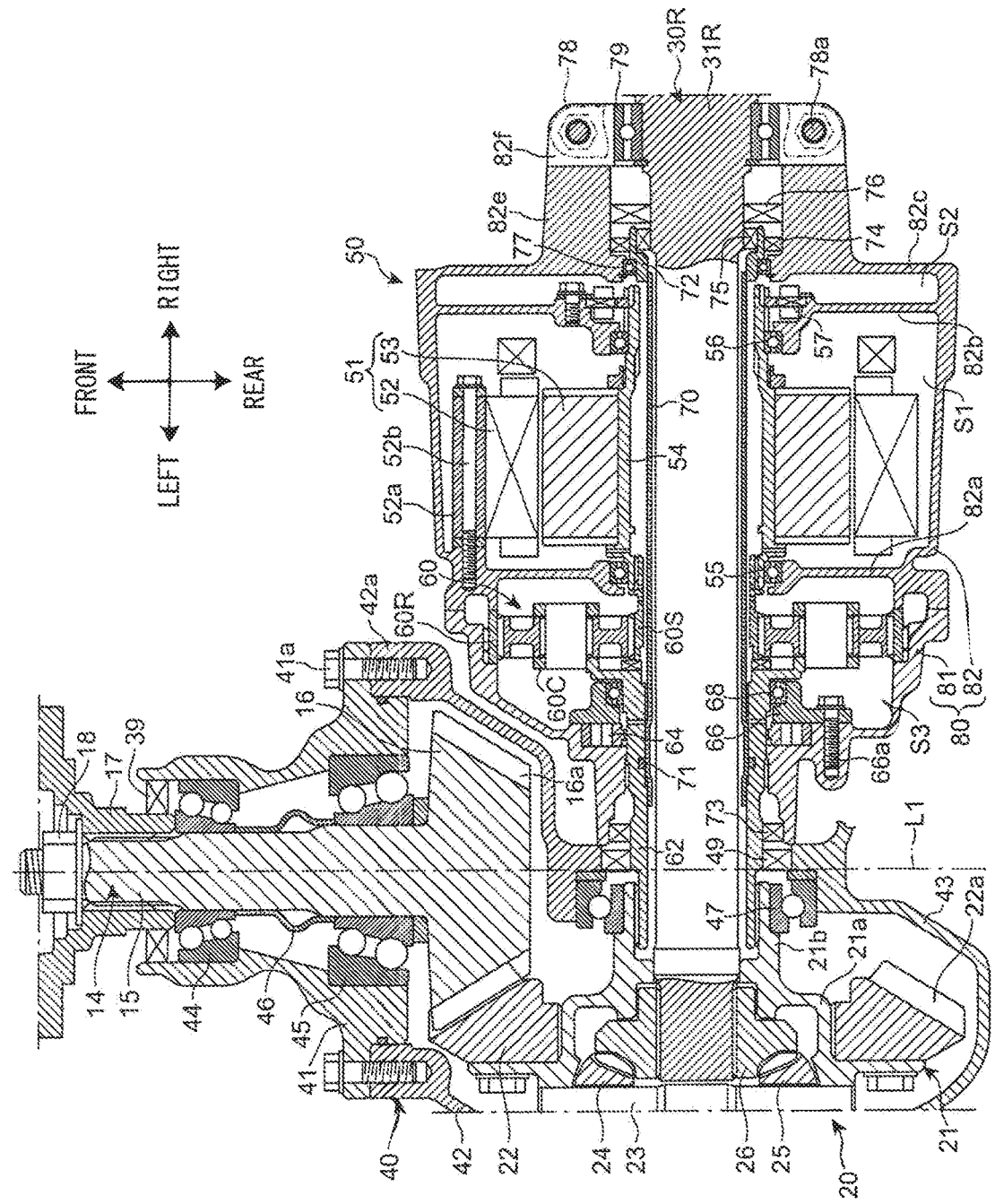
FIG. 3 is a sectional view showing the drive system.

As shown in FIG. 3, the rear end portion of the propeller shaft 14 is constituted by a rear end shaft portion 15. The drive gear 16 is provided, for example, integrally with a rear end portion of the rear end shaft portion 15. The drive gear 16 is a bevel gear arranged such that a tooth portion 16a thereof faces the vehicle body rear side. The drive gear 16 is accommodated in a housing 40 together with the differential device 20.

The housing 40 is constituted by a plurality of housing members 41, 42, and 43 coupled to one another. More specifically, the housing 40 includes: a first housing member 41 accommodating a part of the rear end shaft portion 15 which part is located at a vehicle body front side of the drive gear 16; a second housing member 42 accommodating the drive gear 16 and a part of the differential device 20; and a third housing member 43 accommodating the remaining part of the differential device 20. The second housing member 42 is coupled to the first housing member 41 by bolts 41a at an annular coupling portion 42a located at a radially outer side and vehicle body front side of the drive gear 16.

Lubricating oil is sealed in the housing 40. Used as the oil is oil containing a component which can surely prevent seizing at a meshing portion at which the drive gear 16 and the driven gear 22 mesh with each other and on which especially high load acts.

The rear end shaft portion 15 is supported by the first housing member 41 through, for example, a pair of front and rear bearings 44 and 45. The bearings 44 and 45 are, for example, tandem angular contact ball bearings. The bearing 45 at the vehicle body rear side is larger in diameter than the bearing 44 at the vehicle body front side. A tubular distance piece 46 fitted to an outer side of the rear end shaft portion 15 is interposed between inner races of the pair of bearings 44 and 45.

A coupling member 17 is fitted to an outer side of a part of the rear end shaft portion 15 which part is located at the vehicle body front side of the bearing 44 located at the vehicle body front side. The coupling member 17 is coupled to the universal joint (not shown) provided on the propeller shaft 14.

A nut 18 is threadedly engaged with a front end portion of the rear end shaft portion 15. The coupling member 17, the inner races of the pair of bearings 44 and 45, and the distance piece 46, which are sandwiched between the nut 18 and the drive gear 16 on the rear end shaft portion 15, are positioned in an axial direction and fixed to the rear end shaft portion 15 by tightening the nut 18. An oil seal 39 is interposed between an outer periphery of the coupling member 17 fixed to the rear end shaft portion 15 and an inner periphery of the first housing member 41 so as to allow relative rotation between the coupling member 17 and the first housing member 41.

When tightening the nut 18 during assembling, the distance piece 46 performs elastic deformation and then plastic deformation. In the plastic deformation state of the distance piece 46, preloads of the bearings 44 and 45 are adjusted. By precisely managing the preloads of the bearings 44 and 45 as above, supporting stiffness of the rear end shaft portion 15 supported in a cantilever state from the vehicle body front side is improved.

Differential Device

The driven gear 22 of the differential device 20 is fixed to the differential case 21 by, for example, bolts. It should be noted that the driven gear 22 may be provided integrally with the differential case 21. The driven gear 22 is a bevel gear arranged such that a tooth portion 22a thereof faces the right side in the vehicle body width direction.

The driven gear 22 is arranged at the right side with respect to the pinion shaft 23 in the vehicle body width direction. The tooth portion 22a of the driven gear 22 is arranged so as to project toward the right side in the vehicle body width direction beyond a right surface portion of the accommodating portion 21a and a right end portion of the right side gear 26. The driven gear 22 is arranged adjacent to the driven gear 16 at the left side of the drive gear 16 in the vehicle body width direction and meshes with the drive gear 16.

The accommodating portion 21a and right tubular portion 21b of the differential case 21 are located at the left side with respect to an axis L1 of the propeller shaft 14 in the vehicle body width direction. The accommodating portion 21a is arranged adjacent to the drive gear 16 at the left side of the drive gear 16 in the vehicle body width direction. The right and left tubular portions 21b and 21c are supported by the housing 40 through the respective bearings 47 and 48 (see FIG. 2). The bearings 47 and 48 are located at the left side with respect to the axis L1 of the propeller shaft 14 in the vehicle body width direction.

Motor Unit

The unit case 80 of the motor unit 50 is constituted by a plurality of case members 81 and 82 coupled to each other. More specifically, the unit case 80 includes: a first case member 81 that is open toward the right side in the vehicle body width direction; and a second case member 82 coupled to a right end portion of the first case member 81 by, for example, bolts so as to close an opening portion of the first case member 81.

Oil used to cool the motor 51 and lubricate the speed reducer 60 is sealed in the unit case 80. Used as the oil is oil not containing a component (for example, a substance that corrodes copper) which adversely affects the performance of the motor 51.

The second case member 82 includes a first vertical wall portion 82a, a second vertical wall portion 82b, and an end surface portion 82c, which are arranged perpendicular to the vehicle body width direction. The first vertical wall portion 82a is arranged at a vehicle body width direction inner side of the motor 51. The second vertical wall portion 82b is arranged at a vehicle body width direction outer side of the motor 51. The end surface portion 82c is arranged at the vehicle body width direction outer side of the second vertical wall portion 82b with a gap.

The unit case 80 further includes a tubular projecting portion 82e projecting from the end surface portion 82c toward the vehicle body width direction outer side. A half-split supporting portion 82f is provided at a tip end portion of the projecting portion 82e so as to cover a half circumference of the differential device-side shaft portion 31R of the right axle 30R. A half-split bracket 78 is opposed to the supporting portion 82f so as to cover the remaining half circumference of the differential device-side shaft portion 31R. The supporting portion 82f and the bracket 78 are coupled to each other by bolts 78a. With this, a vehicle body width direction outer end portion of the differential device-side shaft portion 31R is supported by an inner peripheral surface of a tubular portion, formed by the supporting portion 82f and the bracket 78, through a bearing 79.

An oil seal 76 is interposed between an outer peripheral surface of the differential device-side shaft portion 31R and an inner peripheral surface of the projecting portion 82e of the unit case 80 so as to allow relative rotation between the differential device-side shaft portion 31R and the unit case 80. The oil seal 76 is arranged adjacent to the bearing 79 at a side of the bearing 79 which side is close to the differential device 20 in the vehicle body width direction.

The motor unit 50 includes a tubular separating member 70 extending in the axial direction, and the differential device-side shaft portion 31R is inserted into the separating member 70. With this, the differential device-side shaft portion 31R and a group of the speed reducer 60 and the motor 51 are separated from each other in a radial direction by the separating member 70.

An end portion of the separating member 70 which portion is close to the differential device 20 is press-fitted to an inner peripheral surface of a below-described sleeve 62 through an O ring 71. With this, the separating member 70 rotates integrally with the sleeve 62. An annular member 72 is fixed to an end portion of the separating member 70 which portion is far from the differential device 20. The annular member 72 is supported by the second case member 82 through a bearing 77. An oil seal 74 is interposed between the annular member 72 and the second case member 82, and an oil seal 75 is interposed between the annular member 72 and the differential device-side shaft portion 31R.

The oil in the unit case 80 is sealed by the separating member 70 from a radially inner side. Both end portions of the separating member 70 are sealed by the O ring 71 and the oil seal 74.

The motor 51 includes: a stator 52 fixed to the unit case 80; a rotor 53 rotatably provided at a radially inner side of the stator 52; and an output shaft 54 fixed to a radially inner side of the rotor 53 so as to rotate integrally with the rotor 53.

The motor 51 is larger in diameter than the accommodating portion 21a of the differential case 21 and is smaller in diameter than the driven gear 22. The motor 51 is arranged so as to overlap the drive gear 16 in the vehicle body front-rear direction. Further, the motor 51 is arranged adjacent to the drive gear 16 at the right side with respect to the drive gear 16 in the vehicle body width direction across the speed reducer 60.

The stator 52 is configured by winding a coil around a stator core formed by a magnetic body. A plurality of fixed portions 52a are provided at the stator 52 so as to be spaced apart from one another in a circumferential direction. The fixed portions 52a are fixed to the second case member 82 by bolts 52b. The rotor 53 is formed by a tubular magnetic body and rotates by magnetic force generated when electric power is supplied to the stator 52. The stator 52 and the rotor 53 are accommodated in a motor accommodating space S1 formed between the first vertical wall portion 82a and the second vertical wall portion 82b in the second case member 82.

The output shaft 54 is a tubular member arranged at an outer side of the separating member 70 with a gap. The output shaft 54 is supported by an inner peripheral end portion of the first vertical wall portion 82a through a bearing 55 at a side of the rotor 53 which side is close to the differential device 20. The output shaft 54 is further supported by an inner peripheral end portion of the second vertical wall portion 82b through a bearing 56 at a side of the rotor 53 which side is far from the differential device 20.

A resolver 57 configured to detect a rotation angle of the motor 51 is arranged on the output shaft 54 at a side of the bearing 56 which side is far from the differential device 20. The resolver 57 is accommodated in a resolver accommodating space S2 formed between the second vertical wall portion 82b and the end surface portion 82c in the second case member 82.

The speed reducer 60 is arranged adjacent to the motor 51 across the bearing 55 at a side of the motor 51 which side is close to the differential device 20 in the axial direction. The speed reducer 60 is accommodated in a speed reducer accommodating space S3 formed between the first case member 81 and the first vertical wall portion 82a of the second case member 82. The speed reducer 60 is constituted by a planetary gear mechanism arranged on the differential device-side shaft portion 31R. It should be noted that the speed reducer 60 may be constituted by a plurality of planetary gear mechanisms coupled to one another.

The speed reducer 60 includes: a sun gear 60S as an input element; a ring gear 60R as a reaction element; and a carrier 60C as an output element.

The sun gear 60S is arranged at a radially outer side of the separating member 70 with a gap. The sun gear 60S is splined to the output shaft 54 of the motor 51. With this, an output of the motor 51 is input to the sun gear 60S. It should be noted that the sun gear 60S may be provided integrally with the output shaft 54.

The ring gear 60R is splined to an inner peripheral surface of the first case member 81. With this, the ring gear 60R is fixed to the unit case 80 so as not to be rotatable. Since the ring gear 60R is fixed, rotation input to the sun gear 60S is decelerated by the speed reducer 60 and then output from the carrier 60C.

The speed reducer 60 is smaller in diameter and axial size than the motor 51. The speed reducer 60 is arranged adjacent to the drive gear 16 at the right side of the drive gear 16 in the vehicle body width direction. The speed reducer 60 is arranged so as to overlap the drive gear 16 in the vehicle body front-rear direction. Thus, the speed reducer 60 is arranged so as to be sandwiched between the drive gear 16 and the motor 51. The speed reducer 60 is arranged so as to overlap the coupling portion 42a of the second housing member 42 in the vehicle body width direction. Further, the speed reducer 60 is arranged adjacent to the coupling portion 42a at the vehicle body rear side of the coupling portion 42a.

The sleeve 62 extending in the axial direction toward the differential device 20 is provided at an inner peripheral end portion of the carrier 60C. The sleeve 62 is provided integrally with the carrier 60C. With this, the sleeve 62 serves as an output element of the speed reducer 60. It should be noted that the sleeve 62 formed separately from the carrier 60C may be coupled to the carrier 60C so as to rotate integrally with the carrier 60C.

The sleeve 62 serving as the output element of the speed reducer 60 rotates at a lower speed than the motor 51. With this, the separating member 70 fixed to the sleeve 62 as above also rotates at a lower speed than the motor 51. Therefore, the rotating speed of the separating member 70 relative to the unit case 80 can be reduced. With this, load applied to the oil seal 74 and the bearing 77 interposed between the second case member 82 and the annular member 72 fixed to an end portion of the separating member 70 which portion is far from the differential device 20 can be reduced.

The sleeve 62 penetrates the first case member 81 and extends toward the differential device 20. A tip end portion of the sleeve 62 is inserted into the housing 40. An oil seal 73 is interposed between the inner peripheral surface of the first case member 81 and an outer peripheral surface of the sleeve 62 at an end portion of the first case member 81 which portion is close to the differential device 20.

An oil seal 49 is interposed between an inner peripheral surface of the housing 40 and the outer peripheral surface of the sleeve 62. The right tubular portion 21b of the differential case 21 and the bearing 47 are arranged adjacent to the oil seal 49 at a side of the oil seal 49 which side is close to the differential device 20. The oil seal 73 of the first case member 81 is arranged adjacent to the oil seal 49 at a side of the oil seal 49 which side is far from the differential device 20.

The tip end portion of the sleeve 62 is splined to an inner side of the right tubular portion 21b of the differential case 21. With this, the sleeve 62 and the differential case 21 rotate integrally. When the motor 51 drives, the power of the motor 51 is transmitted through the speed reducer 60 to the differential case 21. Especially, when the motor 51 drives while the engine 11 (see FIG. 1) is driving, the power of the engine 11 is integrated with the power of the motor 51 in the differential case 21, and the integrated power is transmitted to the driving wheels 38L and 38R (see FIG. 1) through the axles 30L and 30R.

An oil pump 64 configured to supply oil to the motor accommodating space S1, the resolver accommodating space S2, and the speed reducer accommodating space S3 is arranged in the unit case 80 so as to be located at a side of the speed reducer 60 which side is close to the differential device 20. The oil pump 64 is a gear type oil pump arranged on the sleeve 62 and is driven by rotation of the sleeve 62.

An annular positioning member 66 fitted to an outer side of the sleeve 62 is arranged at a side of the oil pump 64 which side is far from the differential device 20. The positioning member 66 is fixed to the first case member 81 by bolts 66a from a side far from the differential device 20 and supports the sleeve 62 through a bearing 68. The oil pump 64 is positioned in the axial direction by being sandwiched by the first case member 81 and the positioning member 66 from both sides in the axial direction.

The oil pump 64 is smaller in diameter than or substantially equal in diameter to the bearing 47 supporting the right tubular portion 21b of the differential case 21. The oil pump 64 is arranged at the vehicle body rear side of the drive gear 16. The oil pump 64 is arranged so as to overlap the drive gear 16 in the vehicle body width direction.

Effects of Embodiment 1

As above, in Embodiment 1, the accommodating portion 21a of the differential case 21 is arranged at the left side with respect to the axis L1 of the propeller shaft 14 in the vehicle body width direction. Further, the accommodating portion 21a is arranged adjacent to the drive gear 16 at the left side with respect to the drive gear 16 in the vehicle body width direction. As above, the accommodating portion 21a of the differential case 21 is arranged at the left side of the vehicle body width direction middle. With this, the motor unit 50 arranged on the right axle 30R is easily arranged closer to the vehicle body width direction middle than a case where the accommodating portion 21a is arranged immediately behind the drive gear 16 on the axis of the propeller shaft 14.

Therefore, as shown in FIG. 1, a vehicle body width direction size D1 of a region between the driving wheel 38R and the motor unit 50 at the right axle 30R can be increased. Therefore, in the right axle 30R, the inner universal joint 34R is easily arranged close to the vehicle body width direction middle. With this, a vehicle body width direction size D2 of a region between the universal joint 34R and the driving wheel 38R can be increased. Therefore, the intermediate shaft portion 32R is easily configured to be long. With this, the bend angles at the inner and outer universal joints 34R and 35R are prevented from increasing, and therefore, the efficiency of power transmission of the right axle 30R is prevented from deteriorating.

At the left axle 30L, the motor unit 50 is not interposed between the differential device 20 and the inner universal joint 34L. With this, a layout in which the universal joint 34L is arranged close to the vehicle body width direction middle can be easily realized. Therefore, a vehicle body width direction size of a region between the inner universal joint 34L and the driving wheel 38L at the left axle 30L can be easily made equal to the size D2 of the region at the right axle 30R.

Therefore, the universal joints 34L and 35L on the left axle 30L and the universal joints 34R and 35R on the right axle 30R are easily arranged bilaterally symmetrically. With this, the bend angles at the inner universal joints 34L and 34R and the bend angles at the outer universal joints 35L and 35R are easily uniformized between the left and right axles 30L and 30R. Therefore, a difference between the efficiency of power transmission of the left axle 30L and the efficiency of power transmission of the right axle 30R is hardly generated. With this, a difference between the torque transmitted to the left driving wheel 38L and the torque transmitted to the right driving wheel 38R is hardly generated.

Further, as described above, the differential case 21 is arranged closer to the left side in the vehicle body width direction than conventional cases. Therefore, while arranging the inner universal joint 34R close to the left side as above, a vehicle body width direction space at which the motor unit 50 is arranged is easily secured in a region extending from the universal joint 34R to the differential device 20. On this account, the motor unit 50 can be increased in size in the axial direction. With this, torque assist and motor traveling by utilizing high output of the motor unit 50 are easily realized.

Further, in Embodiment 1, the motor 51 of the motor unit 50 arranged on the right axle 30R is arranged at the right side with respect to the propeller shaft 14 in the vehicle body width direction. Therefore, the motor 51 can be arranged close to the battery 2 arranged at the right side with respect to the propeller shaft 14 in the vehicle body width direction. On this account, routing of the electric wire 4 connecting the battery 2 and the motor 51 is easily simplified or shortened.

Further, the motor 51 is arranged at an opposite side of the exhaust pipe 12 of the engine 11 across the propeller shaft 14 in the vehicle body width direction. Therefore, heat damage caused by the exhaust pipe 12 can be prevented from occurring at the motor 51.

Further, as shown in FIG. 3, in Embodiment 1, the speed reducer 60 smaller in diameter than the motor 51 is arranged between the drive gear 16 and the motor 51. Since the speed reducer 60 arranged adjacent to the drive gear 16 is smaller in diameter than the motor 51, the speed reducer 60 is easily arranged close to the drive gear 16 while avoiding interference with the drive gear 16 and the housing 40 accommodating the drive gear 16, especially the coupling portion 42a of the housing 40.

Further, since the speed reducer 60 is constituted by a planetary gear mechanism that is compact in the vehicle body width direction, the motor 51 is easily arranged close to the drive gear 16 across the speed reducer 60.

Therefore, the speed reducer 60 and the motor unit 50 including the motor 51 are easily arranged close to the differential device 20 in the vehicle body width direction while avoiding interference with the drive gear 16 and its peripheral members. With this, the drive gear 16 and the motor unit 50 can be compactly arranged in a space limited in the vehicle body width direction.

Embodiment 2

A hybrid vehicle 210 according to Embodiment 2 will be explained with reference to FIGS. 4 and 5. In Embodiment 2 and FIGS. 4 and 5, the same reference signs are used for the same components as in Embodiment 1, and a repetition of the same explanation is avoided.

Figure 4:
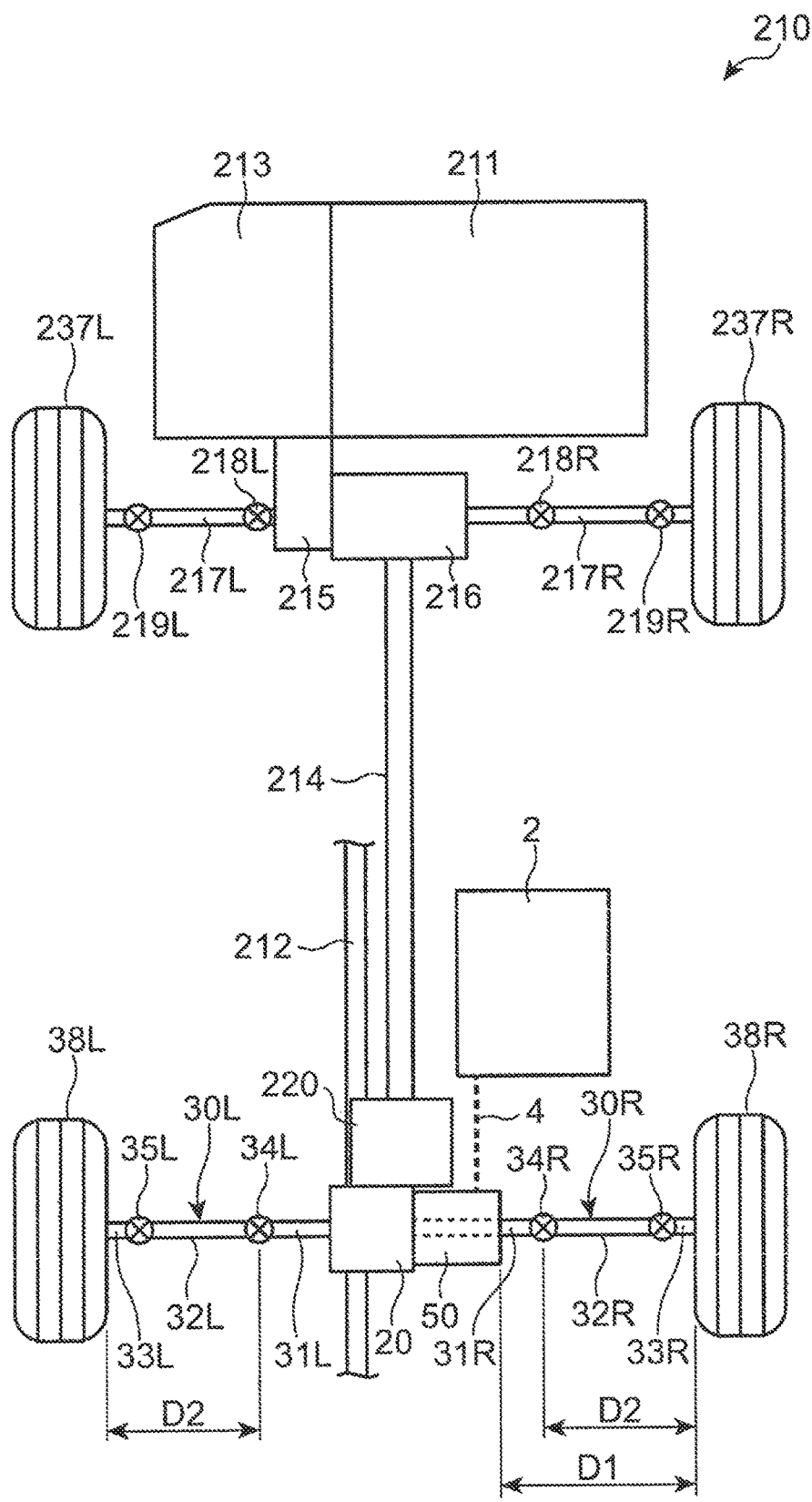
FIG. 4 is a plan view showing an entire configuration of a drive system of a 4 WD hybrid vehicle according to Embodiment 2.

As shown in FIG. 4, the hybrid vehicle 210 is a four-wheel drive vehicle manufactured based on a front engine-front drive (FF) vehicle. As the driving sources for vehicle traveling, the hybrid vehicle 210 includes: a transversely mounted type engine 211 mounted in an engine room located at a vehicle body front portion; and the motor 51 (see FIG. 5) that is the same as that of Embodiment 1.

A transmission 213 is connected to an output shaft of the engine 211 through, for example, a torque converter (not shown), and an output portion of the transmission 13 is connected to a differential case of a front wheel differential device 215. The front wheel differential device 215 is connected to a left front wheel 237L through a front wheel axle 217L at which a pair of universal joints 218L and 219L are provided and also connected to a right front wheel 237R through a front wheel axle 217R at which a pair of universal joints 218R and 219R are provided.

With this, an output of the engine 211 is transmitted through the transmission 213 to the front wheel differential device 215. Then, the power transmitted to the front wheel differential device 215 is transmitted to the left and right axles 217L and 217R and the front wheels 237L and 237R such that a rotation difference corresponds to a vehicle traveling state.

A transfer device 216 is arranged on the right axle 217R. The transfer device 216 takes out the output of the engine 211 to the rear wheels 38L and 38R, the output being transmitted through the transmission 213 to the front wheel differential device 215. The transfer device 216 is arranged on the right axle 217R so as to be located between the front wheel differential device 215 and the inner universal joint 218R. An input side of the transfer device 216 is coupled to the differential case of the front wheel differential device 215, and an output side of the transfer device 216 is coupled to a propeller shaft 214.

In Embodiment 2, the propeller shaft 214 achieves a function of transmitting the power, taken out by the transfer device 216, to the rear wheels 38L and 38R. The propeller shaft 214 is arranged so as to extend in the vehicle body front-rear direction. A center axis of the propeller shaft 214 is arranged at a vehicle body width direction substantially middle. Universal joints (not shown) are provided at the propeller shaft 214, and the propeller shaft 214 is constituted by a plurality of shaft members coupled to one another through the universal joints. A rear end portion of the propeller shaft 214 is constituted by the rear end shaft portion 15 (FIG. 5) that is the same as that of Embodiment 1.

A coupling 220 configured to perform torque distribution for the front and rear wheels is provided at the propeller shaft 214. A rear end side of the propeller shaft 214 is coupled through the coupling 220 to the rear wheel differential device 20 that is the same as that of Embodiment 1. With this, the power taken out from the transfer device 216 is transmitted through the propeller shaft 214 and the coupling 220 to the rear wheel differential device 20. The power transmitted to the rear wheel differential device 20 is transmitted to the left and right axles 30L and 30R and the rear wheels 38L and 38R such that a rotation difference corresponds to a vehicle traveling state as with Embodiment 1.

Figure 5:
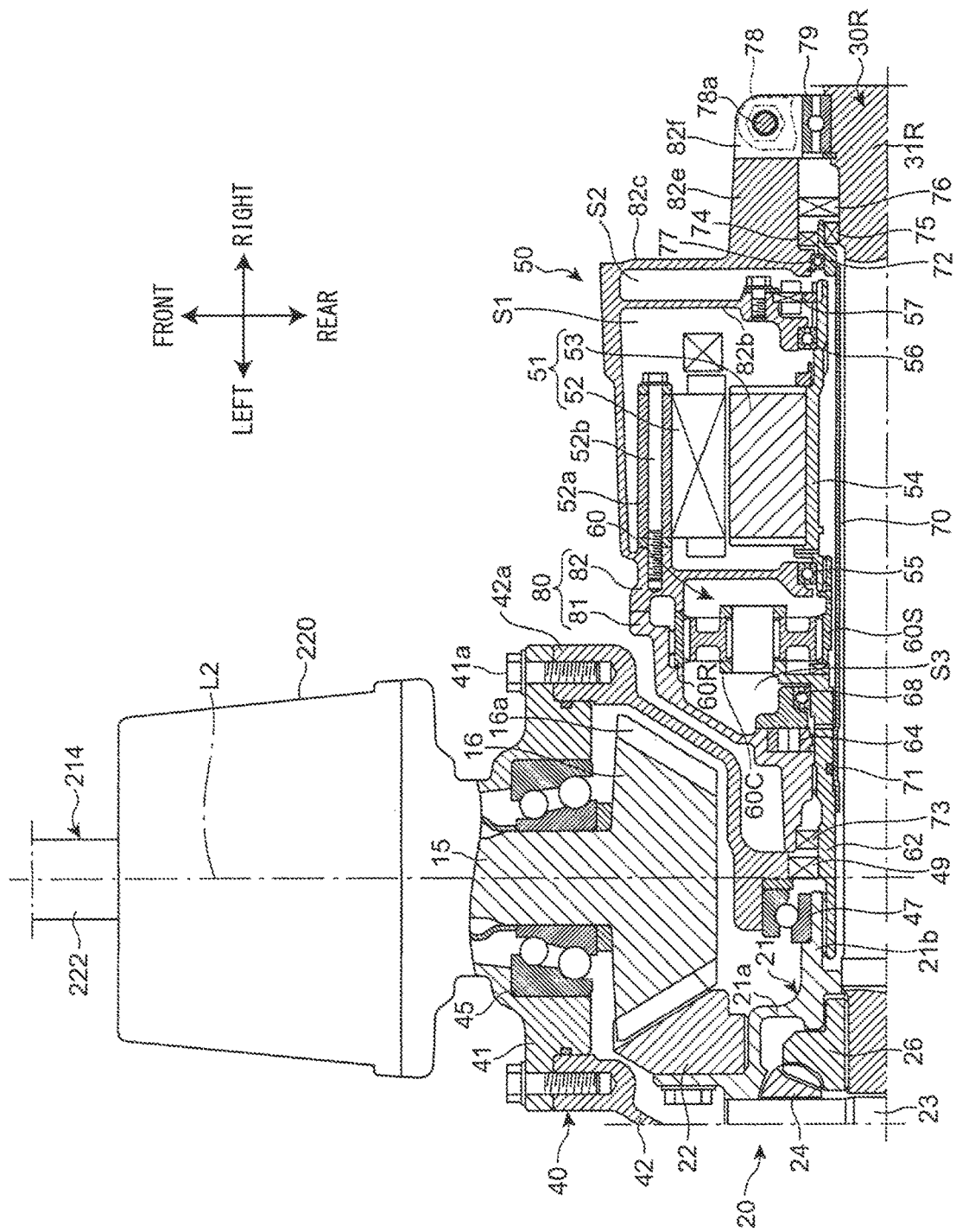
FIG. 5 is a sectional view showing configurations of a rear differential device and its peripheral portions in the drive system.

As shown in FIG. 5, the coupling 220 is provided between the rear end shaft portion 15 constituting the propeller shaft 214 and an intermediate shaft portion 222 located at the vehicle body front side of the rear end shaft portion 15. The coupling 220 is arranged at the vehicle body front side of the drive gear 16 and is fixed to a front end portion of the housing 40 by, for example, bolts.

As shown in FIGS. 4 and 5, the configuration of a drive system from the drive gear 16 at the rear end of the propeller shaft 214 to the rear wheels 38L and 38R is the same as that of Embodiment 1. To be specific, a relative positional relation among the rear end shaft portion 15, the drive gear 16, the differential device 20, the housing 40, and the motor unit 50 and a positional relation of each of the rear end shaft portion 15, the drive gear 16, the differential device 20, the housing 40, and the motor unit 50 with respect to an axis L2 of the propeller shaft 214 are the same as those of Embodiment 1.

Therefore, in the four-wheel drive hybrid vehicle 210 of Embodiment 2, the motor unit 50 is easily arranged close to the left side in the vehicle body width direction. With this, the same effects as Embodiment 1 can be obtained.

To be specific, in the right rear wheel axle 30R at which the motor unit 50 is arranged, the intermediate shaft portion 32R is easily configured to be long. With this, the bend angles at the inner and outer universal joints 34R and 35R are prevented from increasing, and the efficiency of power transmission of the right axle 30R is prevented from deteriorating.

Further, the inner universal joints 34L and 34R and the outer universal joints 35L and 35R are easily arranged bilaterally symmetrically between the left and right rear wheel axles 30L and 30R. With this, the bend angles at the universal joints 34L and 34R and the bend angles at the universal joints 35L and 35R are easily uniformized between the left and right axles 30L and 30R. Therefore, a difference between the efficiency of power transmission of the left axle 30L and the efficiency of power transmission of the right axle 30R is hardly generated. With this, a difference between the torque transmitted to the left rear wheel 38L and the torque transmitted to the right rear wheel 38R is hardly generated.

Further, as shown in FIG. 4, as with Embodiment 1, the motor 51 can be arranged close to the battery 2 arranged at the right side with respect to the propeller shaft 14 in the vehicle body width direction. Therefore, the routing of the electric wire 4 connecting the battery 2 and the motor 51 is easily simplified or shortened.

Further, as with Embodiment 1, the motor 51 can be arranged far from the exhaust pipe 12 of the engine 11, the exhaust pipe 12 being arranged at the left side with respect to the propeller shaft 14 in the vehicle body width direction. Therefore, the heat damage caused by the exhaust pipe 12 can be prevented from occurring at the motor 51.

Embodiment 3

A hybrid vehicle 310 according to Embodiment 3 will be explained with reference to FIG. 6. In Embodiment 3 and FIG. 6, the same reference signs are used for the same components as in Embodiment 1, and a repetition of the same explanation is avoided.

The hybrid vehicle 310 is a FR automobile having an entire configuration (see FIG. 1) similar to that of Embodiment 1 but is different from Embodiment 1 regarding the configurations and layouts of a motor unit 350 and a differential device 320. Hereinafter, components of Embodiment 3 which are different from Embodiment 1 will be explained.

Figure 6:
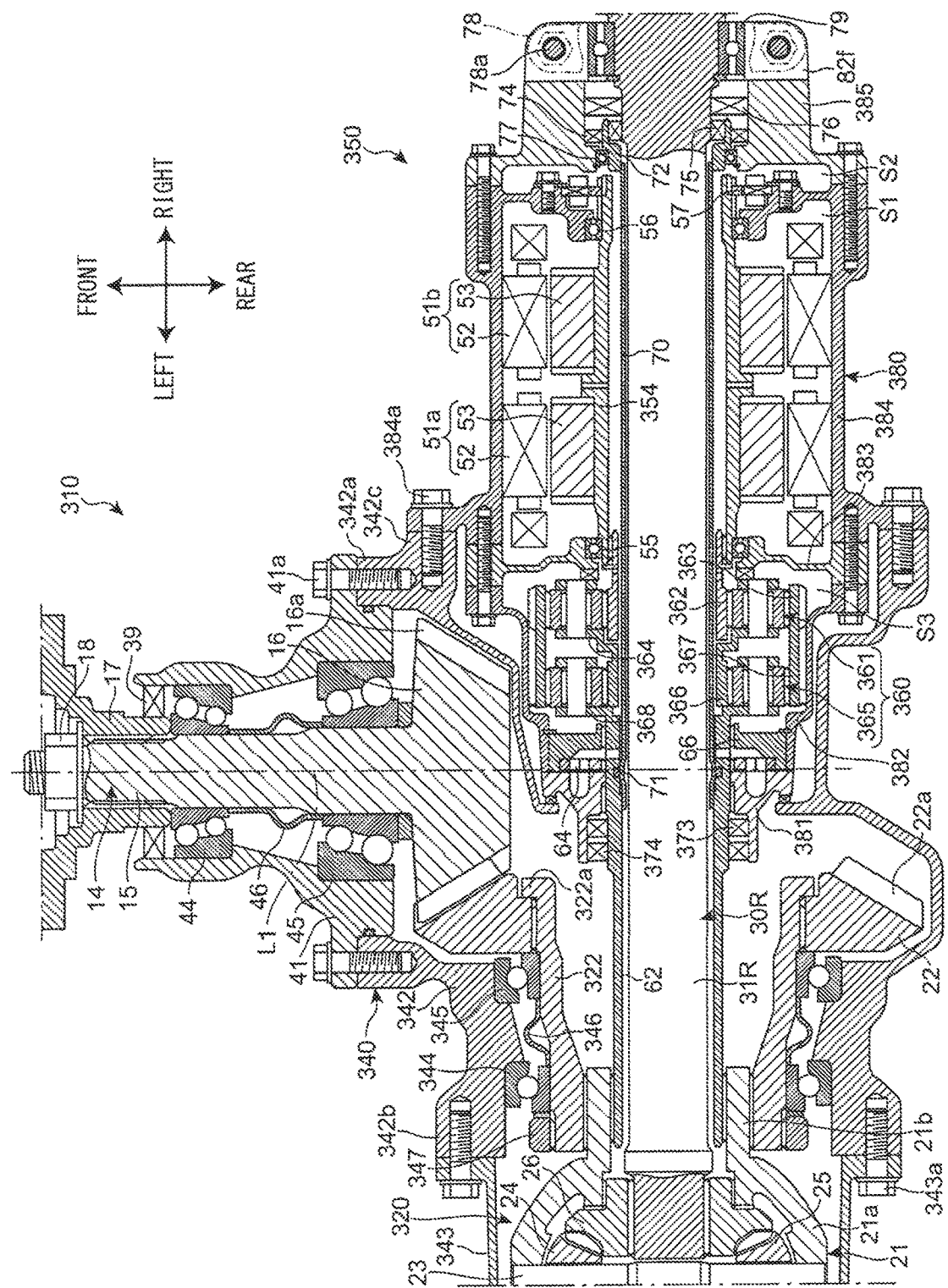
FIG. 6 is a sectional view showing configurations of a differential device and its peripheral portions in a drive system of a hybrid vehicle according to Embodiment 3.

As shown in FIG. 6, the motor unit 350 is arranged on the differential device-side shaft portion 31R of the right axle 30R. The motor unit 350 includes: a first motor 51a and a second motor 51b as the driving sources for vehicle traveling; a speed reducer 360 provided between the differential device 320 and a group of the motors 51a and 51b; and a unit case 380 accommodating the motors 51a and 51b and the speed reducer 360.

The unit case 380 includes a first case member 381, a second case member 382, a third case member 383, a fourth case member 384, and a fifth case member 385 coupled to one another. The first to fifth case members 381 to 385 are arranged in this order from the differential device 320 side in the vehicle body width direction. Most of the unit case 380 is arranged at the right side of the axis L1 of the propeller shaft 14, but a part of the unit case 380 is arranged so as to project toward the left side beyond the axis L1 of the propeller shaft 14.

As with Embodiment 1, oil used to cool the motors 51a and 51b and lubricate the speed reducer 360 is sealed in the unit case 380. As with Embodiment 1, the oil in the unit case 380 is sealed by the separating member 70 from a radially inner side and is suitably sealed by the O ring 71 and the oil seals 74, 75, and 76.

The half-split supporting portion 82f similar to that of Embodiment 1 is provided at a vehicle body width direction outer end portion of the fifth case member 385 of the unit case 380. The vehicle body width direction outer end portion of the differential device-side shaft portion 31R of the right axle 30R is supported through the bearing 79 by the supporting portion 82f of the unit case 380 and the half-split bracket 78 coupled to the supporting portion 82f.

The first motor 51a and the second motor 51b are arranged in this order from the differential device 320 side in the vehicle body width direction. Each of the motors 51a and 51b includes: the stator 52 fixed to the fourth case member 384 of the unit case 380; and the rotor 53 rotatably provided at a radially inner side of the stator 52. The stators 52 and the rotors 53 are accommodated in the motor accommodating space S1 formed between the third case member 383 and the fourth case member 384.

An output shaft 354 is fixed at a radially inner side of the rotors 53 of the first and second motors 51a and 51b. With this, the output shaft 354 rotates integrally with the two rotors 53. The output shaft 354 is supported by the third case member 383 through the bearing 55 at a side of the rotor 53 of the first motor 51a which side is close to the differential device 320. Further, the output shaft 354 is supported by the fourth case member 384 through the bearing 56 at a side of the rotor 53 of the second motor 51b which side is far from the differential device 320.

As above, since the driving source coupled to the output shaft 354 is divided into the two motors 51a and 51b, the output as a whole can be increased while downsizing the motors 51a and 51b. The first motor 51a and the second motor 51b are equal in diameter to each other. Each of the motors 51a and 51b is substantially equal in diameter to the accommodating portion 21a of the differential case 21 of the differential device 320 and is smaller in diameter than the driven gear 22. The first and second motors 51a and 51b are arranged so as to overlap the drive gear 16 in the vehicle body front-rear direction.

The resolver 57 configured to detect the rotation angles of the first and second motors 51a and 51b is arranged on the output shaft 354 at a side of the bearing 56 which side is far from the differential device 320. The resolver 57 is accommodated in the resolver accommodating space S2 formed between the fourth case member 384 and the fifth case member 385.

The speed reducer 360 is arranged adjacent to the first and second motors 51a and 51b across the bearing 55 at a side of the first and second motors 51a and 51b which side is close to the differential device 320 in the axial direction. The speed reducer 360 is accommodated in the speed reducer accommodating space S3 formed by the first to third case members 81 to 83.

The speed reducer 360 includes a first planetary gear mechanism 361 and a second planetary gear mechanism 365 which are arranged on the differential device-side shaft portion 31R. The first planetary gear mechanism 361 and the second planetary gear mechanism 365 are arranged in this order from the motors 51a and 51b side in the axial direction.

The first planetary gear mechanism 361 includes: a sun gear 362 as an input element; a ring gear 363 as a reaction element; and a carrier 364 as an output element. Similarly, the second planetary gear mechanism 365 includes: a sun gear 366 as an input element; a ring gear 367 as a reaction element; and a carrier 368 as an output element.

The ring gears 363 and 367 of the first and second planetary gear mechanisms 361 and 365 are provided integrally with each other. The integrated ring gears 363 and 367 are splined to an inner peripheral surface of the second case member 382. With this, the ring gears 363 and 367 are fixed to the unit case 380 so as not to be rotatable.

The sun gear 362 of the first planetary gear mechanism 361 is arranged at a radially outer side of the separating member 70 with a gap. The sun gear 362 is splined to the output shaft 354 of the motors 51a and 51b. With this, outputs of the motors 51a and 51b are input to the sun gear 362. It should be noted that the sun gear 362 may be provided integrally with the output shaft 354.

Since the ring gear 363 is fixed in the first planetary gear mechanism 361, the rotation input to the sun gear 362 is decelerated by the first planetary gear mechanism 361 and then output from the carrier 364.

The sun gear 366 of the second planetary gear mechanism 365 is arranged at a radially outer side of the separating member 70 with a gap. The sun gear 366 is integrally continuous with an inner peripheral end portion of the carrier 364 of the first planetary gear mechanism 361. With this, the output of the first planetary gear mechanism 361 is input to the sun gear 366 of the second planetary gear mechanism 365.

Similarly, since the ring gear 367 is fixed in the second planetary gear mechanism 365, the rotation input to the sun gear 366 is decelerated by the second planetary gear mechanism 365 and then output from the carrier 368.

As above, the speed reducer 360 decelerates the rotation in two stages by the two planetary gear mechanisms 361 and 365. With this, the speed reducer 360 as a whole can obtain an adequate reduction ratio while downsizing the planetary gear mechanisms 361 and 365. Therefore, the output torque of the first and second motors 51a and 51b is effectively increased by the speed reducer 360, so that the motors 51a and 51b can be further downsized.

It should be noted that in Embodiment 3, the speed reducer 360 may be constituted by one planetary gear mechanism or three or more planetary gear mechanisms.

The first and second planetary gear mechanisms 361 and 365 are equal in diameter to each other and are smaller in diameter than the first and second motors 51a and 51b. Further, each of the planetary gear mechanisms 361 and 365 is smaller in size in the axial direction than each of the motors 51a and 51b. An axial size of the entire speed reducer 360 is substantially equal to an axial size of each of the motors 51a and 51b.

The first and second planetary gear mechanisms 361 and 365 are arranged at the vehicle body rear side of the drive gear 16. A part of the first planetary gear mechanism 361 which part is close to the differential device 320 is arranged so as to overlap the drive gear 16 in the vehicle body width direction. The entire second planetary gear mechanism 365 is arranged so as to overlap the drive gear 16 in the vehicle body width direction.

The sleeve 62 extending in the axial direction toward the differential device 320 is provided at an inner peripheral end portion of the carrier 368 of the second planetary gear mechanism 365. The sleeve 62 is provided integrally with the carrier 368. With this, the sleeve 62 serves as the output element of the speed reducer 360. It should be noted that the sleeve 62 formed separately from the carrier 368 may be coupled to the carrier 368 so as to rotate integrally with the carrier 368.

The sleeve 62 penetrates the first case member 381 and extends toward the differential device 320. The tip end portion of the sleeve 62 is splined to an inner side of the right tubular portion 21b of the differential case 21. With this, the sleeve 62 and the differential case 21 rotate integrally with each other. When the motors 51a and 51b drive, the power of the motors 51a and 51b is transmitted through the speed reducer 360 to the differential case 21.

The oil pump 64 is arranged in the unit case 380 so as to be located at a side of the speed reducer 360 which side is close to the differential device 320. The oil pump 64 is a gear type oil pump arranged on the sleeve 62 and is driven by the rotation of the sleeve 62. The oil ejected from the oil pump 64 is supplied to the motor accommodating space S1, the resolver accommodating space S2, the speed reducer accommodating space S3, and the like.

The annular positioning member 66 fitted to the outer side of the sleeve 62 is arranged at a side of the oil pump 64 which side is far from the differential device 320. The positioning member 66 is fixed to the first and second case members 381 and 382. The oil pump 64 is positioned in the axial direction by being sandwiched by the first case member 381 and the positioning member 66 from both sides in the axial direction.

The oil pump 64 and the positioning member 66 are smaller in diameter than the first and second planetary gear mechanisms 361 and 365 and are arranged adjacent to the drive gear 16 at the vehicle body rear side of the drive gear 16. The entire oil pump 64 and the entire positioning member 66 are arranged so as to overlap the drive gear 16 in the vehicle body width direction. The oil pump 64 is arranged on the axis L1 of the propeller shaft 14 or in the vicinity of the axis L1 of the propeller shaft 14.

As with Embodiment 1, the differential device 320 is accommodated in a housing 340 together with the drive gear 16. The housing 340 includes the first housing member 41, a second housing member 342, and a third housing member 343, which are coupled to one another.

The first housing member 41 is similar to that of Embodiment 1. The first housing member 41 accommodates a part of the rear end shaft portion 15 and supports the rear end shaft portion 15 in a cantilever state through the bearings 44 and 45. The second housing member 342 includes: a first coupling portion 342a coupled to the first housing member 41 by the bolts 41a; a second coupling portion 342b coupled to the third housing member 343 by bolts 343a; and a third coupling portion 342c coupled to the unit case 380 by bolts 384a.

The first coupling portion 342a is an annular portion arranged on the axis L1 of the propeller shaft 14 and is arranged adjacent to the drive gear 16 at a radially outer side and vehicle body front side of the drive gear 16. The first coupling portion 342a is arranged at the left side of the first and second motors 51a and 51b in the vehicle body width direction and also arranged so as to overlap the first and second planetary gear mechanisms 361 and 365.

The second coupling portion 342b is an annular portion arranged on the axis of the axle 30R and is arranged at the left side with respect to the first coupling portion 342a in the vehicle body width direction. The second coupling portion 342b is arranged so as to overlap the drive gear 16 in the vehicle body front-rear direction.

The third coupling portion 342c is an annular portion arranged on the axis of the axle 30R and is arranged so as to overlap a right end portion of the first coupling portion 342a in the vehicle body width direction. The third coupling portion 342c is arranged so as to overlap the drive gear 16 in the vehicle body front-rear direction. The third coupling portion 342c is arranged at the left side of the first and second motors 51a and 51b in the vehicle body width direction and is arranged so as to overlap the first planetary gear mechanism 361 in the vehicle body width direction.

Lubricating oil is sealed in the housing 340. Used as the oil is oil containing a component which can surely prevent seizing at a meshing portion at which the drive gear 16 and the driven gear 22 mesh with each other and on which especially high load acts.

The first case member 381 of the unit case 380 penetrates a right surface portion of the second housing member 342 in the vehicle body width direction, and a part of the first case member 381 gets into the housing 340. In the housing 340, a pair of left and right oil seals 373 and 374 are interposed between an inner peripheral surface of the first case member 381 and the outer peripheral surface of the sleeve 62. With this, the oil sealed in the housing 340 and the oil sealed in the unit case 380 are prevented from being mixed with each other.

The differential case 21 of the differential device 320 is arranged at the left side of the drive gear 16 and the driven gear 22, which meshes with the drive gear 16, in the vehicle body width direction with a gap. The driven gear 22 is coupled to the differential case 21 through a tubular extension member 322 extending in the vehicle body width direction.

The extension member 322 is splined to an outer side of the right tubular portion 21b of the differential case 21. The extension member 322 is provided so as to extend toward the right side in the vehicle body width direction from a fitting portion where the extension member 322 is fitted to the right tubular portion 21b. An enlarged diameter portion 322a projecting toward the radially outer side is provided at a right end portion of the extension member 322. The driven gear 22 is splined to an outer side of the extension member 322 at a position located adjacent to the enlarged diameter portion 322a at the left side of the enlarged diameter portion 322a.

The extension member 322 is supported by the second housing member 342 through a pair of left and right bearings 344 and 345. With this, the right tubular portion 21b is supported by the housing 340 through the extension member 322 and the pair of bearings 344 and 345. The bearings 344 and 345 are, for example, angular ball bearings. The right bearing 345 is larger in diameter than the left bearing 344. A tubular distance piece 346 fitted to an outer side of the extension member 322 is interposed between inner races of the pair of bearings 344 and 345.

A nut 347 is threadedly engaged with an outer side of a portion of the extension member 322 which portion is located at the left side of the left bearing 344. The inner races of the pair of bearings 344 and 345, the distance piece 346, and the driven gear 22, which are sandwiched between the nut 347 and the enlarged diameter portion 322a on the extension member 322, are positioned in the axial direction and fixed to the extension member 322 by tightening the nut 347.

When tightening the nut 347 during assembling, the distance piece 346 performs elastic deformation and then plastic deformation. In the plastic deformation state of the distance piece 346, preloads of the bearings 344 and 345 are adjusted. By precisely managing the preloads of the bearings 344 and 345 as above, supporting stiffness of the extension member 322 supported in a cantilever state from the left side in the vehicle body width direction is improved.

As above, in Embodiment 3, the differential case 21 is arranged at the left side with respect to the drive gear 16 in the vehicle body width direction with a gap. With this, a space is formed immediately behind the drive gear 16. By utilizing this space, a part of a left end side of the motor unit 350 is arranged, specifically a part of the speed reducer 360 which is reduced in diameter as above, the oil pump 64 which is further smaller in diameter, and the like are arranged. As above, the small-diameter portions at the left end side of the motor unit 350 are arranged so as to overlap the drive gear 16 in the vehicle body width direction. With this, an interval between the drive gear 16 and the axle 30R in the vehicle body front-rear direction is prevented from increasing, and the motor unit 350 is easily arranged close to the left side in the vehicle body width direction.

Therefore, in Embodiment 3, as with Embodiment 1, in the right axle 30R, the inner universal joint 34R (see FIG. 1) is easily arranged close to the vehicle body width direction middle. With this, the bend angles at the inner and outer universal joints 34R and 35R (see FIG. 1) are prevented from increasing, and the efficiency of power transmission of the right axle 30R is prevented from deteriorating.

Further, as with Embodiment 1, the universal joints 34L and 35L (see FIG. 1) on the left axle 30L and the universal joints 34R and 35R (see FIG. 1) on the right axle 30R are easily arranged bilaterally symmetrically. Therefore, a difference between the efficiency of power transmission of the left axle 30L and the efficiency of power transmission of the right axle 30R is hardly generated. With this, a difference between the torque transmitted to the left driving wheel 38L and the torque transmitted to the right driving wheel 38R is hardly generated.

Further, by utilizing the space on the right axle 30R which space is larger in the vehicle body width direction than conventional cases, the plurality of planetary gear mechanisms 361 and 365 and the plurality of motors 51a and 51b are included as above. Therefore, the motor unit 350 which is increased in size in the axial direction can be arranged. With this, torque assist and motor traveling by utilizing high output of the motor unit 350 are easily realized.

Embodiment 4

A hybrid vehicle 410 according to Embodiment 4 will be explained with reference to FIGS. 7 to 9. The hybrid vehicle 410 according to Embodiment 4 has a configuration in which left and right are reversed from the configuration of the hybrid vehicle 10 according to Embodiment 1. Components of Embodiment 4 which are different from Embodiment 1 will be explained. In Embodiment 4 and FIGS. 7 to 9, the same reference signs are used for the same components as in Embodiment 1, and a repetition of the same explanation is avoided.

Figure 7:
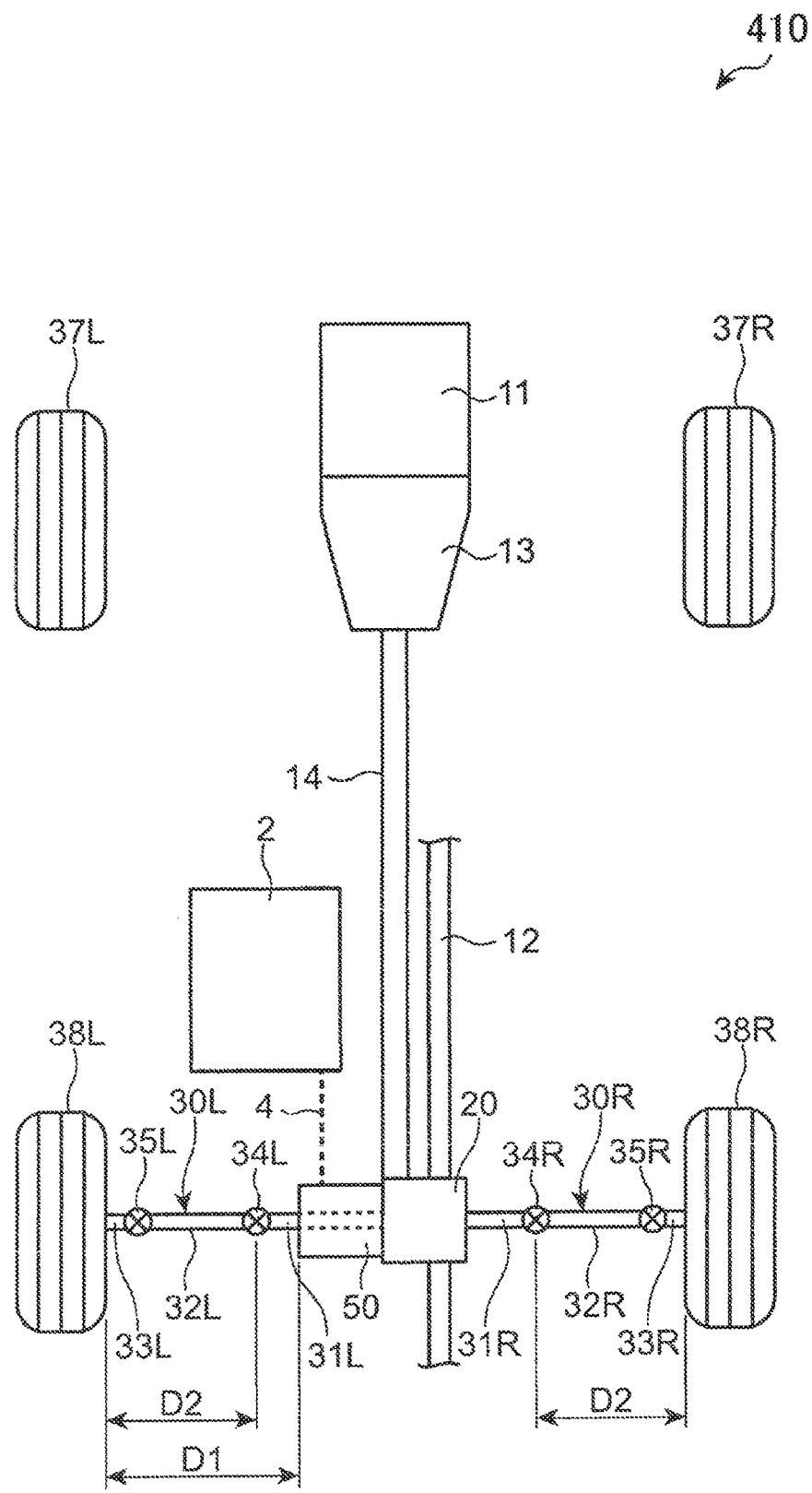
FIG. 7 is a plan view showing an entire configuration of a drive system of a FR hybrid vehicle according to Embodiment 4 of the present invention.

In Embodiment 4, as shown in FIG. 7, the exhaust pipe 12 is arranged so as to extend at the right side with respect to the propeller shaft 14 in the vehicle body width direction. The exhaust pipe 12 is not necessarily arranged at the right side of the propeller shaft 14 over the entire length. In a region in which at least the rear end portion of the propeller shaft 14 is located in the vehicle body front-rear direction, the exhaust pipe 12 is arranged at the right side with respect to the propeller shaft 14 in the vehicle body width direction with a gap.

The battery 2 electrically connect to the motor 51 through the electric wire 4 is arranged at the left side with respect to the propeller shaft 14 in the vehicle body width direction. It should be noted that a fuel tank (not shown) is arranged at the right side of the battery 2 across the propeller shaft 14.

Figure 8:
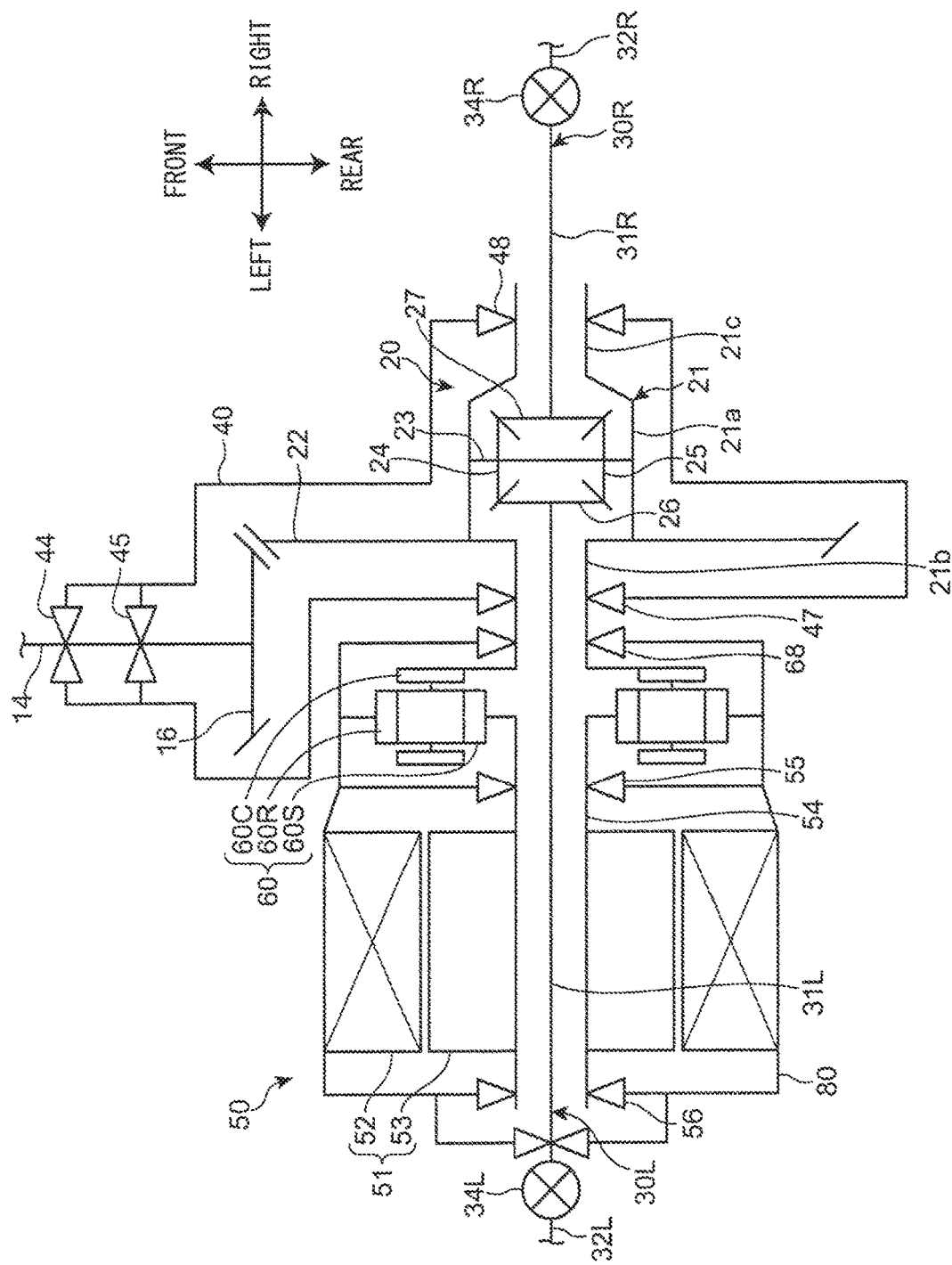
FIG. 8 is a schematic diagram showing configurations of a differential device and its peripheral portions in the drive system.

As shown in FIGS. 7 and 8, the left axle 30L connects a left side gear 26 and the left driving wheel 38L through the pair of universal joints 34L and 35L, and the right axle 30R connects a right side gear 27 and the right driving wheel 38R through the pair of universal joints 34R and 35R.

The motor unit 50 including the motor 51 is arranged on the differential device-side shaft portion 31L of the left axle 30L. In addition to the motor 51, the motor unit 50 further includes the speed reducer 60 arranged between the differential device 20 and the motor 51 on the axle 30L. The motor 51 and the speed reducer 60 are accommodated in the unit case 80 and unitized.

The differential case 21 is configured such that the power transmitted from the engine 11 and the power transmitted from the motor 51 join together. A power transmission path extending from the motor 51 to the differential case 21 is formed independently from a power transmission path extending from the engine 11 to the differential case 21. Therefore, by mounting the preassembled motor unit 50 on the axle 30L without changing configurations related to the power transmission path extending from the engine 11, an engine automobile can be easily converted into a hybrid vehicle.

The driven gear 22 is a bevel gear arranged such that the tooth portion 22a thereof faces the left side in the vehicle body width direction. The driven gear 22 is arranged at the left side with respect to the pinion shaft 23 in the vehicle body width direction. The tooth portion 22a of the driven gear 22 is arranged so as to project toward the left side in the vehicle body width direction beyond a left surface portion of the accommodating portion 21a and a left end portion of the left side gear 26. The driven gear 22 is arranged adjacent to the drive gear 16 at the right side of the drive gear 16 in the vehicle body width direction and meshes with the drive gear 16.

The accommodating portion 21a and left tubular portion 21b of the differential case 21 are located at the right side with respect to the axis L1 of the propeller shaft 14 in the vehicle body width direction. Further, the accommodating portion 21a is arranged adjacent to the drive gear 16 at the right side of the drive gear 16 in the vehicle body width direction. The left and right tubular portions 21b and 21c are supported by the housing 40 through the respective bearings 47 and 48 (see FIG. 8). The bearings 47 and 48 are located at the right side with respect to the axis L1 of the propeller shaft 14 in the vehicle body width direction.

The unit case 80 includes: the first case member 81 that is open toward the left side in the vehicle body width direction; and the second case member 82 coupled to a left end portion of the first case member 81 by, for example, bolts so as to close an opening portion of the first case member 81.

The unit case 80 further includes the tubular projecting portion 82e projecting from the end surface portion 82c toward the vehicle body width direction outer side. The half-split supporting portion 82f is provided at the tip end portion of the projecting portion 82e so as to cover a half circumference of the differential device-side shaft portion 31L of the left axle 30L. The half-split bracket 78 is opposed to the supporting portion 82f so as to cover the remaining half circumference of the differential device-side shaft portion 31L. The supporting portion 82f and the bracket 78 are coupled to each other by the bolts 78a. With this, a vehicle body width direction outer end portion of the differential device-side shaft portion 31L is supported by an inner peripheral surface of a tubular portion, formed by the supporting portion 82f and the bracket 78, through the bearing 79.

The oil seal 76 is interposed between an outer peripheral surface of the differential device-side shaft portion 31L and an inner peripheral surface of the projecting portion 82e of the unit case 80 so as to allow relative rotation between the differential device-side shaft portion 31L and the unit case 80. The oil seal 76 is arranged adjacent to the bearing 79 at a side of the bearing 79 which side is close to the differential device 20 in the vehicle body width direction.

The motor unit 50 includes the tubular separating member 70 extending in the axial direction, and the differential device-side shaft portion 31L is inserted into the separating member 70. With this, the differential device-side shaft portion 31L and a group of the speed reducer 60 and the motor 51 are separated from each other in the radial direction by the separating member 70.

It should be noted that the oil seal 74 is interposed between the annular member 72 and the second case member 82, and the oil seal 75 is interposed between the annular member 72 and the differential device-side shaft portion 31L.

The motor 51 is arranged so as to overlap the drive gear 16 in the vehicle body front-rear direction. Further, the motor 51 is arranged adjacent to the drive gear 16 at the left side with respect to the drive gear 16 in the vehicle body width direction across the speed reducer 60. The speed reducer 60 is constituted by a planetary gear mechanism arranged on the differential device-side shaft portion 31L. Further, the speed reducer 60 is arranged adjacent to the drive gear 16 at the left side of the drive gear 16 in the vehicle body width direction.

The oil seal 49 is interposed between the inner peripheral surface of the housing 40 and the outer peripheral surface of the sleeve 62. The left tubular portion 21b of the differential case 21 and the bearing 47 are arranged adjacent to the oil seal 49 at a side of the oil seal 49 which side is close to the differential device 20. The oil seal 73 of the first case member 81 is arranged adjacent to the oil seal 49 at a side of the oil seal 49 which side is far from the differential device 20.

The tip end portion of the sleeve 62 is splined to an inner side of the left tubular portion 21b of the differential case 21. Further, the oil pump 64 is smaller in diameter than or substantially equal in diameter to the bearing 47 supporting the left tubular portion 21b of the differential case 21.

Effects of Embodiment 4

As above, in Embodiment 4, the accommodating portion 21a of the differential case 21 is arranged at the right side with respect to the axis L1 of the propeller shaft 14 in the vehicle body width direction. Further, the accommodating portion 21a is arranged adjacent to the drive gear 16 at the right side with respect to the drive gear 16 in the vehicle body width direction. As above, the accommodating portion 21a of the differential case 21 is arranged at the right side of the vehicle body width direction middle. With this, the motor unit 50 arranged on the left axle 30L is easily arranged closer to the vehicle body width direction middle than a case where the accommodating portion 21a is arranged immediately behind the drive gear 16 on the axis of the propeller shaft 14.

Therefore, as shown in FIG. 7, the vehicle body width direction size D1 of a region between the driving wheel 38L and the motor unit 50 at the left axle 30L can be increased. Therefore, in the left axle 30L, the inner universal joint 34L is easily arranged close to the vehicle body width direction middle. With this, the vehicle body width direction size D2 of a region between the universal joint 34L and the driving wheel 38L can be increased. Therefore, the intermediate shaft portion 32L is easily configured to be long. With this, the bend angles at the inner and outer universal joints 34L and 35L are prevented from increasing, and therefore, the efficiency of power transmission of the left axle 30L is prevented from deteriorating.

At the right axle 30R, the motor unit 50 is not interposed between the differential device 20 and the inner universal joint 34R. With this, a layout in which the universal joint 34R is arranged close to the vehicle body width direction middle can be easily realized. Therefore, a vehicle body width direction size of a region between the inner universal joint 34R and the driving wheel 38R at the right axle 30R can be easily made equal to the size D2 of the region at the left axle 30L.

Therefore, the universal joints 34L and 35L on the left axle 30L and the universal joints 34R and 35R on the right axle 30R are easily arranged bilaterally symmetrically. With this, the bend angles at the inner universal joints 34L and 34R and the bend angles at the outer universal joints 35L and 35R are easily uniformized between the left and right axles 30L and 30R. Therefore, a difference between the efficiency of power transmission of the left axle 30L and the efficiency of power transmission of the right axle 30R is hardly generated. With this, a difference between the torque transmitted to the left driving wheel 38L and the torque transmitted to the right driving wheel 38R is hardly generated.

Further, as described above, the differential case 21 is arranged closer to the right side in the vehicle body width direction than conventional cases. Therefore, while arranging the inner universal joint 34L close to the right side as above, a vehicle body width direction space at which the motor unit 50 is arranged is easily secured in a region extending from the universal joint 34L to the differential device 20. On this account, the motor unit 50 can be increased in size in the axial direction. With this, torque assist and motor traveling by utilizing high output of the motor unit 50 are easily realized.

Further, in Embodiment 4, the motor 51 of the motor unit 50 arranged on the left axle 30L is arranged at the left side with respect to the propeller shaft 14 in the vehicle body width direction. Therefore, the motor 51 can be arranged close to the battery 2 arranged at the left side with respect to the propeller shaft 14 in the vehicle body width direction. On this account, routing of the electric wire 4 connecting the battery 2 and the motor 51 is easily simplified or shortened.

Further, the motor 51 is arranged at an opposite side of the exhaust pipe 12 of the engine 11 across the propeller shaft 14 in the vehicle body width direction. Therefore, heat damage caused by the exhaust pipe 12 can be prevented from occurring at the motor 51.

Figure 9:
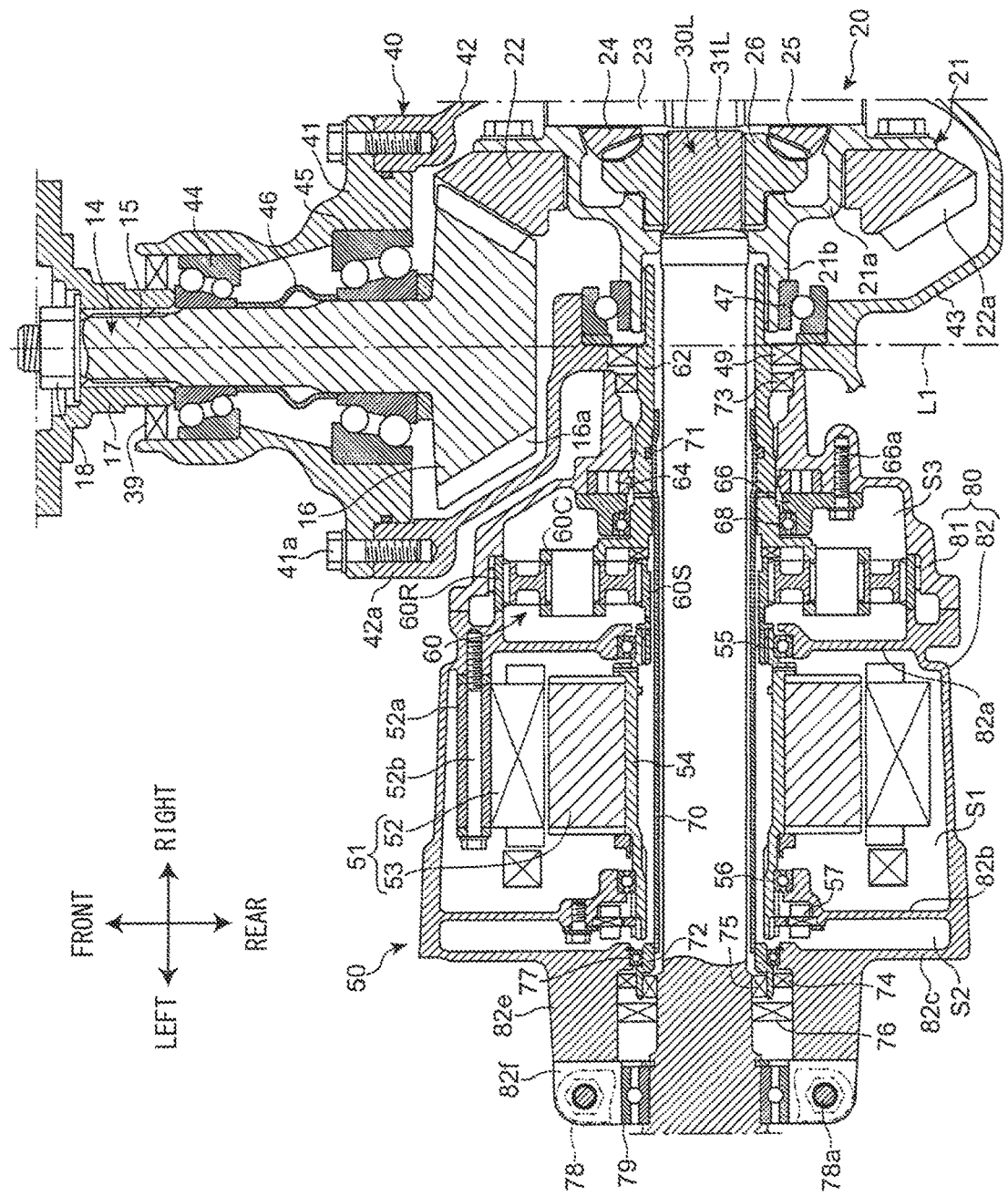
FIG. 9 is a sectional view showing the drive system.

Further, as shown in FIG. 9, in Embodiment 4, the speed reducer 60 smaller in diameter than the motor 51 is arranged between the drive gear 16 and the motor 51. Since the speed reducer 60 arranged adjacent to the drive gear 16 is smaller in diameter than the motor 51, the speed reducer 60 is easily arranged close to the drive gear 16 while avoiding interference with the drive gear 16 and the housing 40 accommodating the drive gear 16, especially the coupling portion 42a of the housing 40.

Further, since the speed reducer 60 is constituted by a planetary gear mechanism that is compact in the vehicle body width direction, the motor 51 is easily arranged close to the drive gear 16 across the speed reducer 60.

Therefore, the speed reducer 60 and the motor unit 50 including the motor 51 are easily arranged close to the differential device 20 in the vehicle body width direction while avoiding interference with the drive gear 16 and its peripheral members. With this, the drive gear 16 and the motor unit 50 can be compactly arranged in a space limited in the vehicle body width direction.

Embodiment 5

Figure 10:
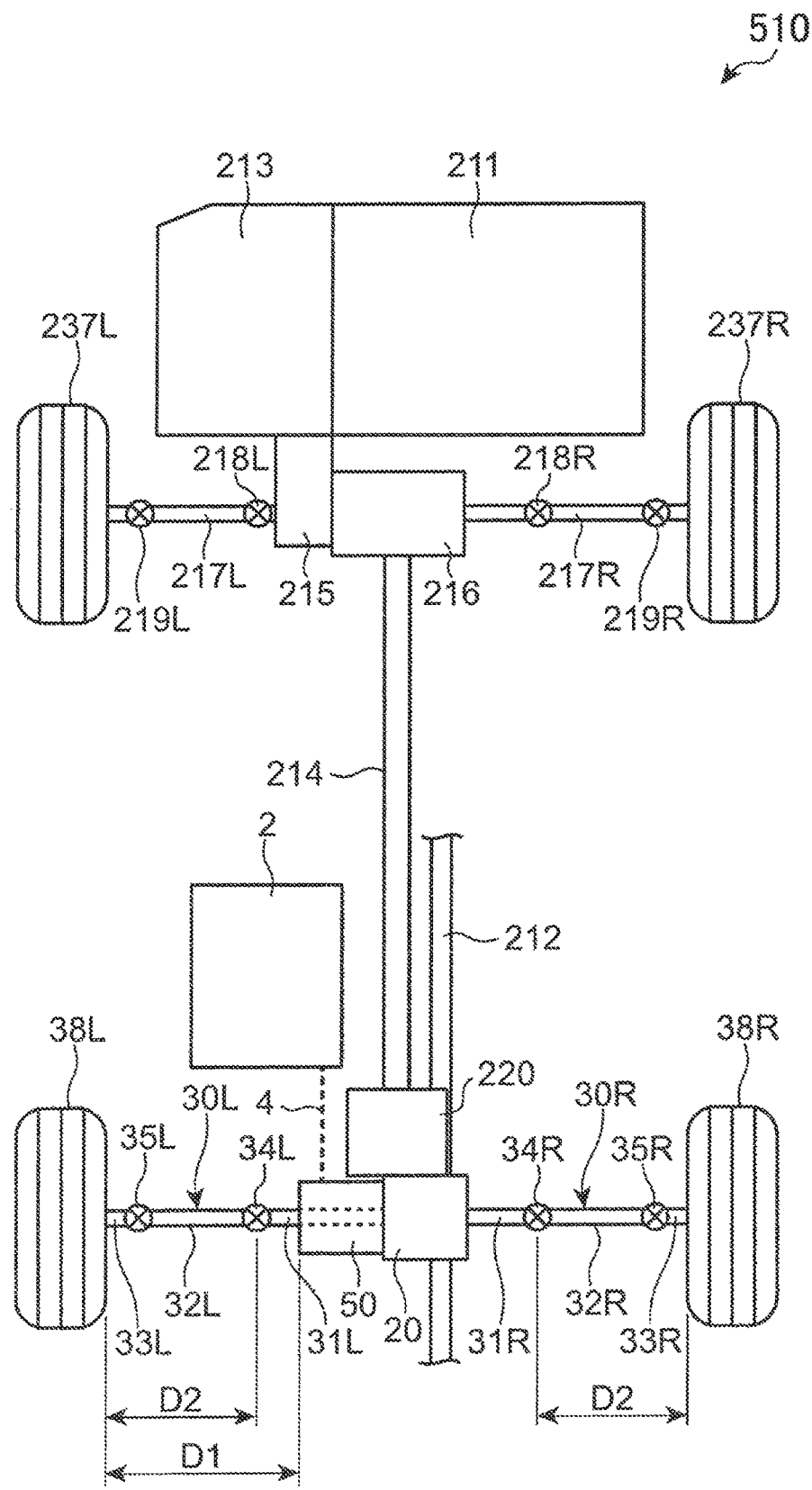
FIG. 10 is a plan view showing an entire configuration of a drive system of a 4 WD hybrid vehicle according to Embodiment 5.
Figure 11:
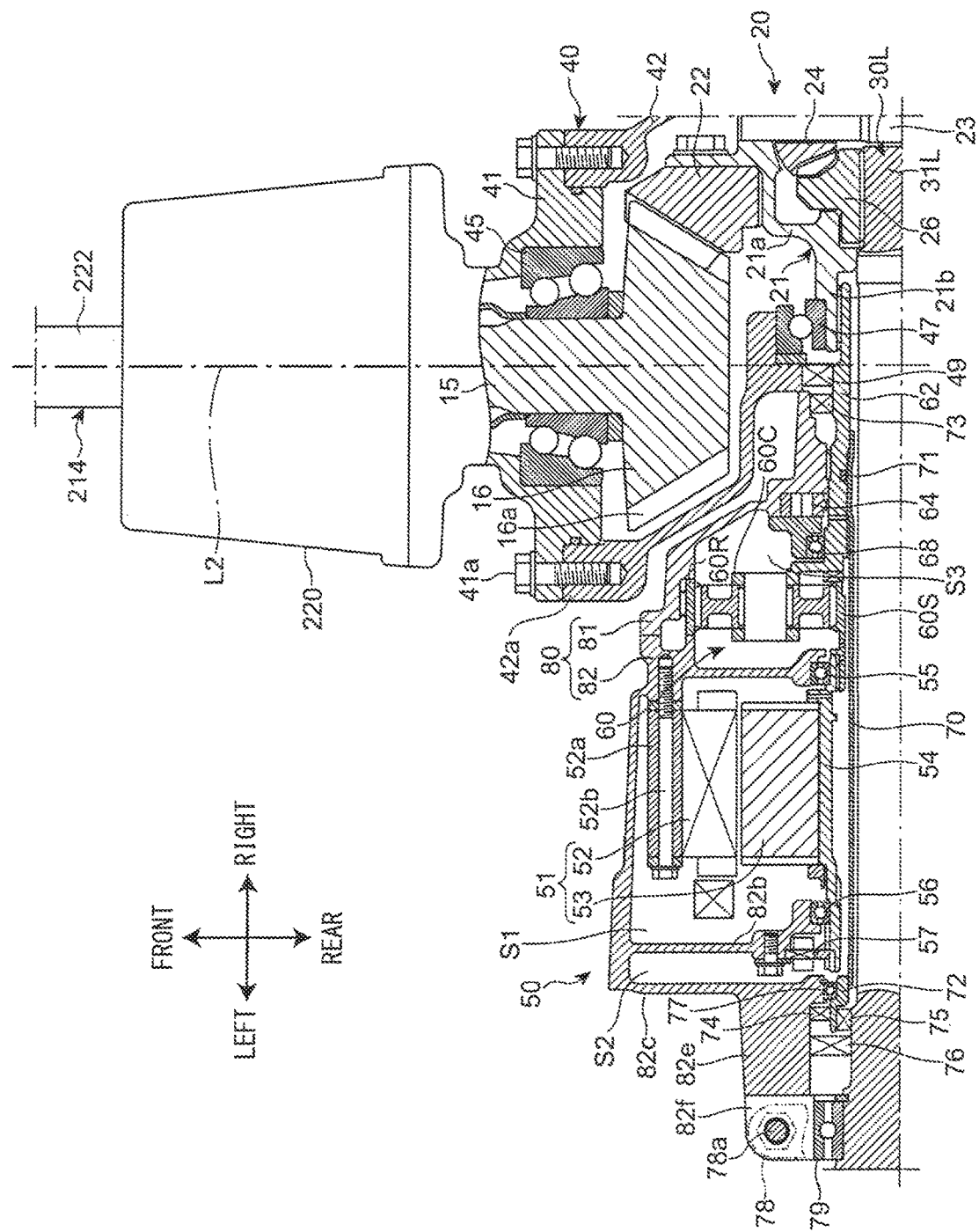
FIG. 11 is a sectional view showing configurations of a rear differential device and its peripheral portions in the drive system.

As shown in FIGS. 10 and 11, a hybrid vehicle 510 according to Embodiment 5 has a configuration in which left and right are reversed from the configuration of the hybrid vehicle 210 according to Embodiment 2. In Embodiment 5 and FIGS. 10 and 11, the same reference signs are used for the same components as in Embodiment 2, and a repetition of the same explanation is avoided.

Since the hybrid vehicle 510 according to Embodiment 5 just have the configuration in which left and right are reversed from the configuration of the hybrid vehicle 210 according to Embodiment 2, the hybrid vehicle 510 according to Embodiment 5 can obtain the same effects as the hybrid vehicle 210 according to Embodiment 2. To be specific, in the left rear wheel axle 30L at which the motor unit 50 is arranged, the intermediate shaft portion 32L is easily configured to be long. With this, the bend angles at the inner and outer universal joints 34R and 35R are prevented from increasing, and the efficiency of power transmission of the left axle 30L is prevented from deteriorating.

Further, the inner universal joints 34L and 34R and the outer universal joints 35L and 35R are easily arranged bilaterally symmetrically between the left and right rear wheel axles 30L and 30R. With this, the bend angles at the universal joints 34L and 34R and the bend angles at the universal joints 35L and 35R are easily uniformized between the left and right axles 30L and 30R. Therefore, a difference between the efficiency of power transmission of the left axle 30L and the efficiency of power transmission of the right axle 30R is hardly generated. With this, a difference between the torque transmitted to the left rear wheel 38L and the torque transmitted to the right rear wheel 38R is hardly generated.

Further, as shown in FIG. 10, as with Embodiment 2, the motor 51 can be arranged close to the battery 2 arranged at the left side with respect to the propeller shaft 14 in the vehicle body width direction. Therefore, the routing of the electric wire 4 connecting the battery 2 and the motor 51 is easily simplified or shortened.

Further, as with Embodiment 2, the motor 51 is arranged far from the exhaust pipe 12 of the engine 11, the exhaust pipe 12 being arranged at the right side with respect to the propeller shaft 14 in the vehicle body width direction. Therefore, the heat damage caused by the exhaust pipe 12 can be prevented from occurring at the motor 51.

Embodiment 6

A hybrid vehicle 610 according to Embodiment 6 will be explained with reference to FIG. 12. The hybrid vehicle 610 according to Embodiment 6 has a configuration in which left and right are reversed from the configuration of the hybrid vehicle 310 according to Embodiment 3. In Embodiment 6 and FIG. 12, the same reference signs are used for the same component as in Embodiment 1, and a repetition of the same explanation is avoided.

Figure 12:
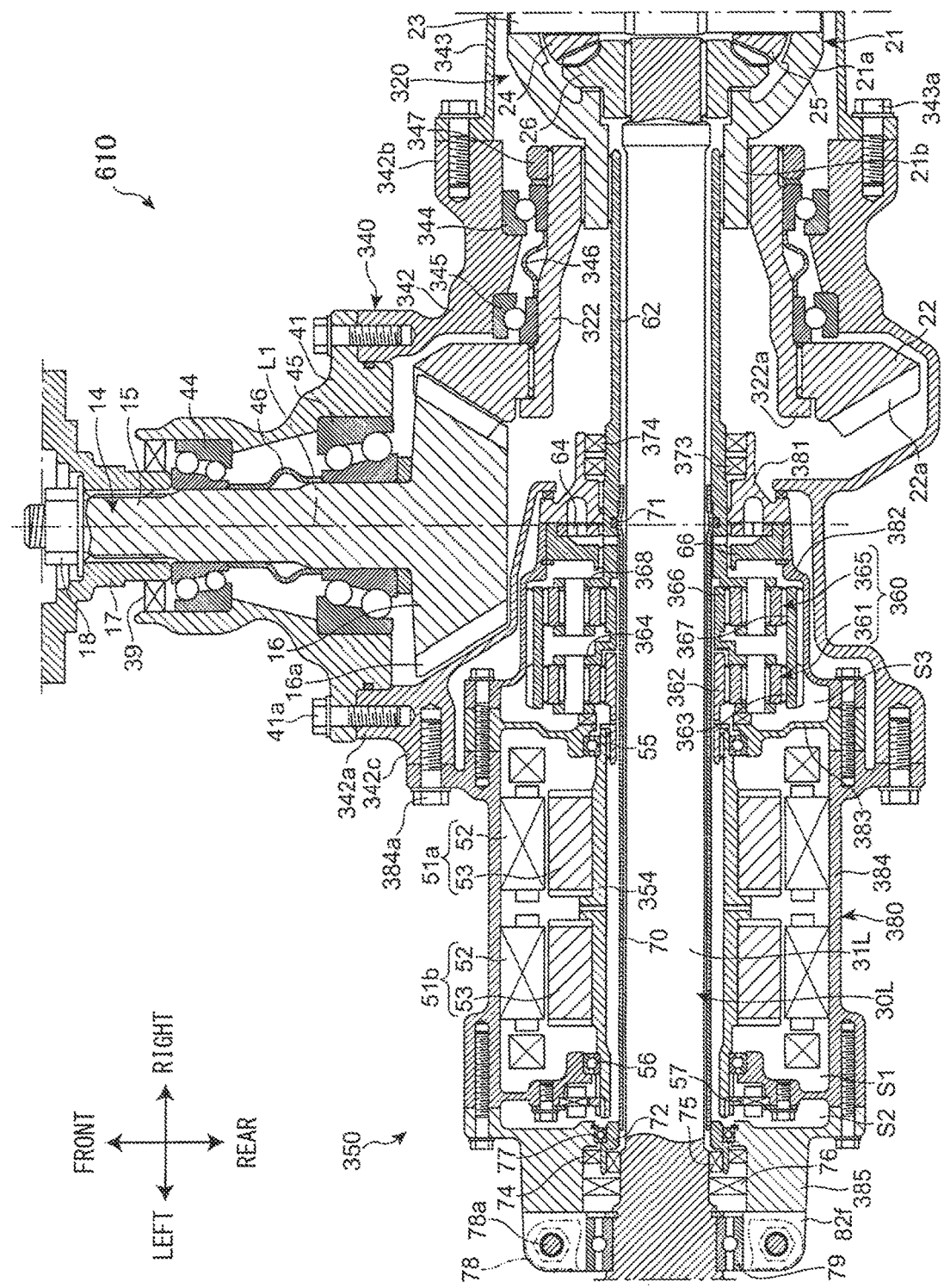
FIG. 12 is a sectional view showing configurations of a differential device and its peripheral portion in a drive system of a hybrid vehicle according to Embodiment 6.
Figure 13:
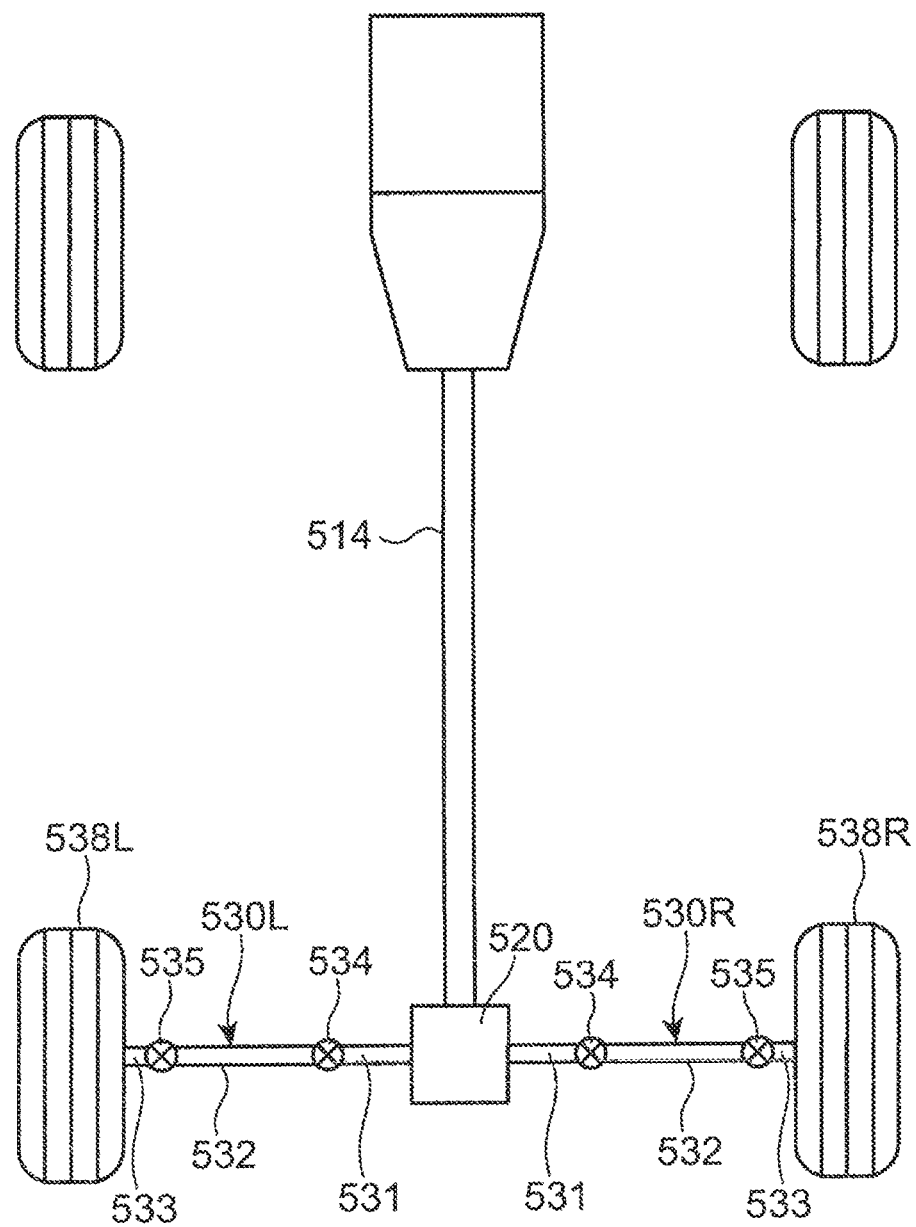
FIG. 13 is a plan view showing a conventional example of a drive system of a FR vehicle.
Figure 14:
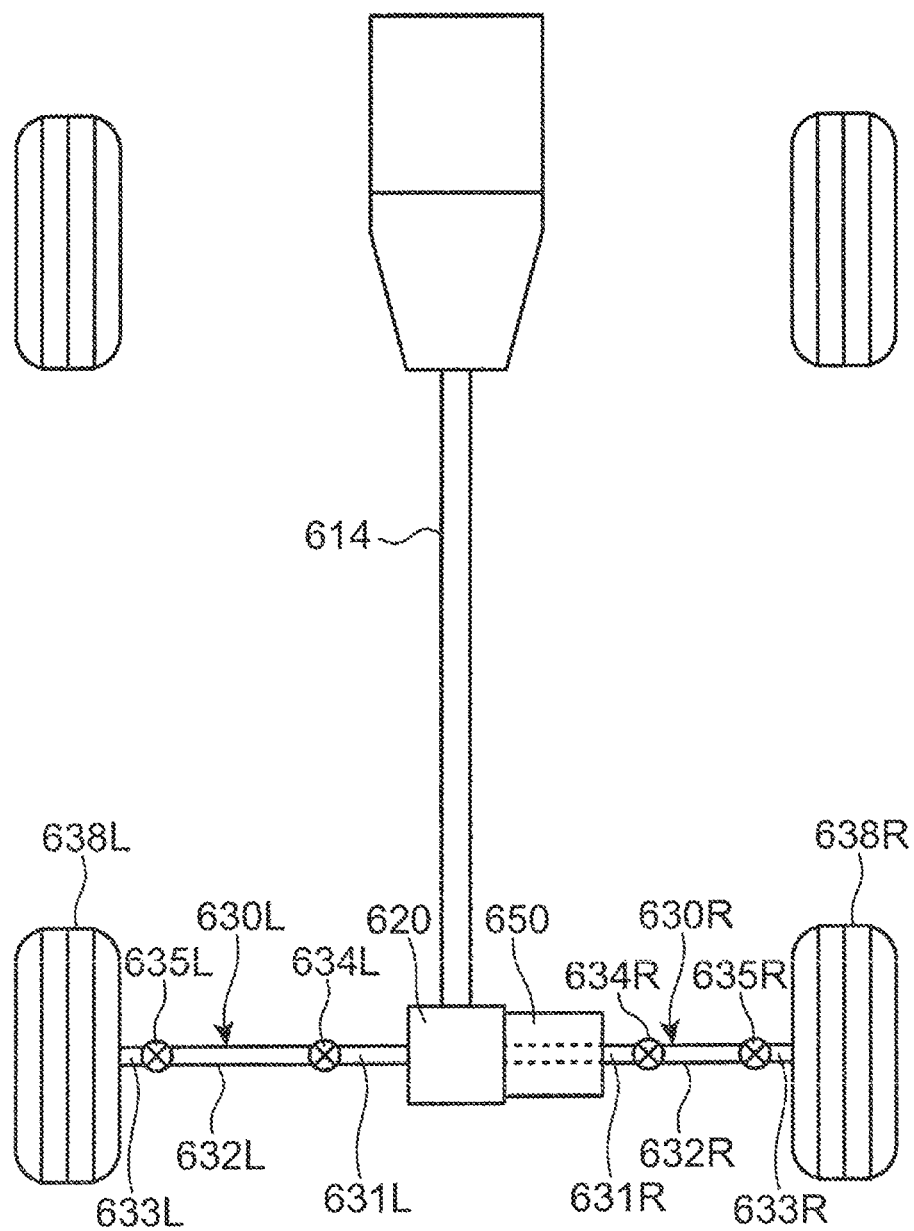
FIG. 14 is a plan view showing a conventional example of a drive system of a FR hybrid vehicle including a motor arranged on an axle.

As shown in FIG. 12, the motor unit 350 is arranged on the differential device-side shaft portion 31L of the left axle 30L. Most of the unit case 380 is arranged at the left side of the axis L1 of the propeller shaft 14, but a part of the unit case 380 is arranged so as to project toward the right side beyond the axis L1 of the propeller shaft 14.

The vehicle body width direction outer end portion of the differential device-side shaft portion 31L of the left axle 30L is supported through the bearing 79 by the supporting portion 82f of the unit case 380 and the half-split bracket 78 coupled to the supporting portion 82f.

The sleeve 62 penetrates the first case member 381 and extends toward the differential device 320. The tip end portion of the sleeve 62 is splined to an inner side of the left tubular portion 21b of the differential case 21.

The second coupling portion 342b is an annular portion arranged on the axis of the axle 30R and is arranged at the right side with respect to the first coupling portion 342a in the vehicle body width direction.

The third coupling portion 342c is an annular portion arranged on the axis of the axle 30R and is arranged so as to overlap a left end portion of the first coupling portion 342a in the vehicle body width direction. The third coupling portion 342c is arranged so as to overlap the drive gear 16 in the vehicle body front-rear direction. The third coupling portion 342c is arranged at the right side of the first and second motors 51a and 51b in the vehicle body width direction and is arranged so as to overlap the first planetary gear mechanism 361 in the vehicle body width direction.

The first case member 381 of the unit case 380 penetrates a left surface portion of the second housing member 342 in the vehicle body width direction, and a part of the first case member 381 gets into the housing 340.

The differential case 21 of the differential device 320 is arranged at the right side of the drive gear 16 and the driven gear 22, which meshes with the drive gear 16, in the vehicle body width direction with a gap.

The extension member 322 is splined to an outer side of the left tubular portion 21b of the differential case 21. The extension member 322 is provided so as to extend toward the left side in the vehicle body width direction from a fitting portion where the extension member 322 is fitted to the left tubular portion 21b. The enlarged diameter portion 322a projecting toward the radially outer side is provided at a left end portion of the extension member 322. The driven gear 22 is splined to an outer side of the extension member 322 at a position located adjacent to the enlarged diameter portion 322a at the right side of the enlarged diameter portion 322a.

The extension member 322 is supported by the second housing member 342 through the pair of left and right bearings 344 and 345. With this, the left tubular portion 21b is supported by the housing 340 through the extension member 322 and the pair of bearings 344 and 345. The left bearing 345 is larger in diameter than the right bearing 344.

The nut 347 is threadedly engaged with an outer side of a portion of the extension member 322 which portion is located at the right side of the right bearing 344.

When tightening the nut 347 during assembling, the distance piece 346 performs elastic deformation and then plastic deformation. In the plastic deformation state of the distance piece 346, preloads of the bearings 344 and 345 are adjusted. By precisely managing the preloads of the bearings 344 and 345 as above, supporting stiffness of the extension member 322 supported in a cantilever state from the right side in the vehicle body width direction is improved.

As above, in Embodiment 6, the differential case 21 is arranged at the right side with respect to the drive gear 16 in the vehicle body width direction with a gap. With this, a space is formed immediately behind the drive gear 16. By utilizing this space, a part of a right end side of the motor unit 350 is arranged, specifically a part of the speed reducer 360 which is reduced in diameter as above, the oil pump 64 which is further smaller in diameter, and the like are arranged. As above, the small-diameter portions at the right end side of the motor unit 350 are arranged so as to overlap the drive gear 16 in the vehicle body width direction. With this, an interval between the drive gear 16 and the axle 30L in the vehicle body front-rear direction is prevented from increasing, and the motor unit 350 is easily arranged close to the right side in the vehicle body width direction.

Therefore, in Embodiment 6, as with Embodiment 3, in the left axle 30L, the inner universal joint 34L (see FIG. 7) is easily arranged close to the vehicle body width direction middle. With this, the bend angles at the inner and outer universal joints 34L and 35L (see FIG. 7) are prevented from increasing, and the efficiency of power transmission of the left axle 30L is prevented from deteriorating.

Further, as with Embodiment 3, the universal joints 34L and 35L (see FIG. 7) on the left axle 30L and the universal joints 34R and 35R (see FIG. 7) on the right axle 30R are easily arranged bilaterally symmetrically. Therefore, a difference between the efficiency of power transmission of the left axle 30L and the efficiency of power transmission of the right axle 30R is hardly generated. With this, a difference between the torque transmitted to the left driving wheel 38L and the torque transmitted to the right driving wheel 38R is hardly generated.

Further, by utilizing the space on the left axle 30L which space is larger in the vehicle body width direction than conventional cases, the plurality of planetary gear mechanisms 361 and 365 and the plurality of motors 51a and 51b are included as above. Therefore, the motor unit 350 which is increased in size in the axial direction can be arranged. With this, torque assist and motor traveling by utilizing high output of the motor unit 350 are easily realized.

The foregoing has explained the present invention based on the above embodiments, but the present invention is not limited to the above embodiments. For example, the configurations of the FR hybrid vehicles 310 and 610 are explained in Embodiments 3 and 6, respectively. However, the configuration of Embodiment 3 shown in FIG. 6 or the configuration of Embodiment 6 shown in FIG. 12 is applicable to the drive system at the rear wheel side of the four-wheel drive hybrid vehicle as in Embodiment 2 or 5. Further, each of the motors 51, 51a, and 51b in the above embodiments may be a motor generator or a generator.

INDUSTRIAL APPLICABILITY

As above, according to the present invention, in a vehicle, such as a hybrid vehicle, in which a motor or a generator is arranged on an axle, efficiency of power transmission of the axle is prevented from deteriorating, and a difference between torque transmitted to a left driving wheel and torque transmitted to a right driving wheel is hardly generated. Therefore, the present invention may be suitably utilized in an industrial field of manufacture of this type of vehicles.

REFERENCE CHARACTER LIST 2 battery
10 hybrid vehicle
11 engine
12 exhaust pipe
13 transmission
14 propeller shaft
15 rear end shaft portion
16 drive gear
20 differential device
21 differential case
21a accommodating portion
21b, 21c tubular portion
22 driven gear
26, 27 side gear
30L, 30R axle
31L, 31R differential device-side shaft portion 32L, 32R intermediate shaft portion
33L, 33R driving wheel-side shaft portion
34L, 34R inner universal joint
35L, 35R outer universal joint
37L, 37R front wheel
38L, 38R rear wheel (driving wheel)
40 housing
50 motor unit
51 motor
51a first motor
51b second motor
52 stator
53 rotor
54 output shaft
60 speed reducer
62 sleeve
64 oil pump
80 unit case
210 hybrid vehicle
211 engine
212 exhaust pipe
213 transmission
214 propeller shaft
215 front wheel differential device
216 transfer device
217L, 217R front wheel axle
220 coupling
237L, 237R front wheel
310 hybrid vehicle
320 differential device
340 housing
350 motor unit
360 speed reducer
361 first planetary gear mechanism
365 second planetary gear mechanism
380 unit case
410 hybrid vehicle
510 hybrid vehicle
610 hybrid vehicle

The invention claimed is:

1. A hybrid vehicle comprising:
an engine;
a propeller shaft rotated by the engine and arranged so as to extend in a vehicle body front-rear direction;
a drive gear provided at a rear end portion of the propeller shaft;
a differential device including:
   a driven gear meshing with the drive gear,
   a differential case configured to rotate together with the driven gear, and
   a pair of left and right side gears accommodated in an accommodating portion of the differential case;
a left axle connecting the left side gear and a left driving wheel through a universal joint;
a right axle connecting the right side gear and a right driving wheel through a universal joint; and
a motor connected to the differential case so as to transmit power to the differential case, wherein:
the motor is arranged at one of right and left sides with respect to an axis of the propeller shaft in a vehicle body width direction;
the differential case is arranged at the other of the right and left sides with respect to the axis of the propeller shaft in the vehicle body width direction;
the motor is connected to the differential case through a speed reducer smaller in diameter than the motor; and
the speed reducer is arranged between the drive gear and the motor.

2. The hybrid vehicle according to claim 1, wherein:
the motor is arranged at the right side with respect to the axis of the propeller shaft in the vehicle body width direction and arranged on the right axle; and
the differential case is arranged such that the accommodating portion is located at the left side with respect to the axis of the propeller shaft in the vehicle body width direction.

3. The hybrid vehicle according to claim 2, wherein a battery electrically connected to the motor is arranged at the right side with respect to the propeller shaft in the vehicle body width direction.

4. The hybrid vehicle according to claim 3, wherein an exhaust pipe of the engine is arranged at the left side with respect to the propeller shaft in the vehicle body width direction, the exhaust pipe extending in the vehicle body front-rear direction.

5. The hybrid vehicle according to claim 2, wherein an exhaust pipe of the engine is arranged at the left side with respect to the propeller shaft in the vehicle body width direction, the exhaust pipe extending in the vehicle body front-rear direction.

6. The hybrid vehicle according to claim 1, wherein:
the motor is arranged at the right side with respect to the axis of the propeller shaft in the vehicle body width direction and arranged on the right axle; and
the differential case is arranged such that the accommodating portion is located at the left side with respect to the axis of the propeller shaft in the vehicle body width direction and located adjacent to the drive gear at a left side of the drive gear in the vehicle body width direction.

7. The hybrid vehicle according to claim 6, wherein a battery electrically connected to the motor is arranged at the right side with respect to the propeller shaft in the vehicle body width direction.

8. The hybrid vehicle according to claim 7, wherein an exhaust pipe of the engine is arranged at the left side with respect to the propeller shaft in the vehicle body width direction, the exhaust pipe extending in the vehicle body front-rear direction.

9. The hybrid vehicle according to claim 6, wherein an exhaust pipe of the engine is arranged at the left side with respect to the propeller shaft in the vehicle body width direction, the exhaust pipe extending in the vehicle body front-rear direction.

10. The hybrid vehicle according to claim 1, wherein:
the motor is arranged at the left side with respect to the axis of the propeller shaft in the vehicle body width direction and arranged on the left axle; and
the differential case is arranged such that the accommodating portion is located at the right side with respect to the axis of the propeller shaft in the vehicle body width direction.

11. The hybrid vehicle according to claim 10, wherein a battery electrically connected to the motor is arranged at the left side with respect to the propeller shaft in the vehicle body width direction.

12. The hybrid vehicle according to claim 11, wherein an exhaust pipe of the engine is arranged at the right side with respect to the propeller shaft in the vehicle body width direction, the exhaust pipe extending in the vehicle body front-rear direction.

13. The hybrid vehicle according to claim 10, wherein an exhaust pipe of the engine is arranged at the right side with respect to the propeller shaft in the vehicle body width direction, the exhaust pipe extending in the vehicle body front-rear direction.

14. The hybrid vehicle according to claim 1, wherein:
the motor is arranged at the left side with respect to the axis of the propeller shaft in the vehicle body width direction and arranged on the left axle; and
the differential case is arranged such that the accommodating portion is located at the right side with respect to the axis of the propeller shaft in the vehicle body width direction and located adjacent to the drive gear at a right side of the drive gear in the vehicle body width direction.

15. The hybrid vehicle according to claim 14, wherein a battery electrically connected to the motor is arranged at the left side with respect to the propeller shaft in the vehicle body width direction.

16. The hybrid vehicle according to claim 15, wherein an exhaust pipe of the engine is arranged at the right side with respect to the propeller shaft in the vehicle body width direction, the exhaust pipe extending in the vehicle body front-rear direction.

17. The hybrid vehicle according to claim 14, wherein an exhaust pipe of the engine is arranged at the right side with respect to the propeller shaft in the vehicle body width direction, the exhaust pipe extending in the vehicle body front-rear direction.

18. The hybrid vehicle according to claim 1, wherein:
the motor is connected to the differential case through the speed reducer smaller in diameter than the motor; and
the speed reducer and the drive gear are arranged so as to overlap each other in the vehicle body width direction.

19. A hybrid vehicle comprising:
an engine;
a propeller shaft rotated by the engine and arranged so as to extend in a vehicle body front-rear direction;
a drive gear provided at a rear end portion of the propeller shaft;
a differential device including:
a driven gear meshing with the drive gear,
a differential case configured to rotate together with the driven gear, and
a pair of left and right side gears accommodated in an accommodating portion of the differential case;
a left axle connecting the left side gear and a left driving wheel through a universal joint;
a right axle connecting the right side gear and a right driving wheel through a universal joint; and
a generator connected to the differential case, wherein:
the generator is arranged at one of right and left sides with respect to an axis of the propeller shaft in a vehicle body width direction;
the differential case is arranged at the other of the right and left sides with respect to the axis of the propeller shaft in the vehicle body width direction;
the generator is connected to the differential case through a speed reducer smaller in diameter than the generator; and
the speed reducer is arranged between the drive gear and the generator.

\* \* \* \* \*